US007293625B2

(12) United States Patent
Kumazawa

(10) Patent No.: US 7,293,625 B2
(45) Date of Patent: Nov. 13, 2007

(54) OPERATING LEVER DEVICE FOR CONSTRUCTION MACHINE AND CONSTRUCTION MACHINE

(75) Inventor: Kouji Kumazawa, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 428 days.

(21) Appl. No.: 10/493,691

(22) PCT Filed: Nov. 5, 2002

(86) PCT No.: PCT/JP02/11504

§ 371 (c)(1),
(2), (4) Date: Apr. 27, 2004

(87) PCT Pub. No.: WO03/040015

PCT Pub. Date: May 15, 2003

(65) Prior Publication Data

US 2005/0034915 A1 Feb. 17, 2005

(30) Foreign Application Priority Data

Nov. 5, 2001 (JP) ............................ 2001-339287

(51) Int. Cl.
*B60K 26/00* (2006.01)

(52) U.S. Cl. ................................ 180/333; 74/471 XY

(58) Field of Classification Search ................ 180/315, 180/332, 333; 74/471 XY; 212/284; 172/2, 172/3
See application file for complete search history.

(56) References Cited

U.S. PATENT DOCUMENTS

| | | | | |
|---|---|---|---|---|
| 4,314,619 | A * | 2/1982 | Tsuji | 180/327 |
| 4,489,805 | A * | 12/1984 | Okabe | 180/271 |
| 4,955,344 | A | 9/1990 | Tatsumi et al. | |
| 5,002,454 | A * | 3/1991 | Hadank et al. | 414/695.5 |
| 5,517,967 | A | 5/1996 | Nakayama | |
| 6,328,127 | B1 * | 12/2001 | Hori et al. | 180/333 |
| 6,571,902 | B2 * | 6/2003 | Heyne et al. | 180/321 |
| 2003/0000327 | A1 * | 1/2003 | Mototani et al. | 74/471 XY |

FOREIGN PATENT DOCUMENTS

| | | |
|---|---|---|
| JP | A 5-116884 | 5/1993 |
| JP | B2 2752820 | 2/1998 |
| JP | A 10-338051 | 12/1998 |
| JP | A 2000-238990 | 9/2000 |
| JP | A 2001-107908 | 4/2001 |
| JP | A-2001-240373 | 9/2001 |

* cited by examiner

*Primary Examiner*—Eric Culbreth
*Assistant Examiner*—Barry Gooden, Jr.
(74) *Attorney, Agent, or Firm*—Oliff & Berridge, PLC

(57) ABSTRACT

At the front end of an operating lever constituted as a joystick lever, a grip that is not allowed to rotate relative to the operating lever is attached. At the front end of the grip, a rotary operating member to be used for prime mover rotation speed adjustment is rotatably mounted. The operator rotates the rotary operating member with his finger tip while holding the grip and moving the operating lever to adjust the prime mover rotation rate and drive an actuator at the same time.

14 Claims, 19 Drawing Sheets

OPERATING LEVER DEVICE FOR CONSTRUCTION MACHINE AND CONSTRUCTION MACHINE

INCORPORATION BY REFERENCE

The disclosure of the following priority application is herein incorporated by reference: Japanese Patent Application No. 2001-339287 filed Nov. 5, 2001

TECHNICAL FIELD

The present invention relates to an operating lever device for a construction machine, having an operating member that is used to control a prime mover rotation rate and is mounted at a grip attached to the front end of an operating lever, and a construction machine having the operating lever device.

BACKGROUND ART

Operating levers having an engine rotation rate control member in the related art include the operating lever disclosed in Japanese Patent Registration No. 2752820. This operating lever includes an operating member that is used to control an engine speed and is mounted a grip main body of a swing lever, which is not allowed to rotate, in such a manner that the operating member can rotate relative to the grip main body. This structure prevents the operating member from being inadvertently operated during an operation for swinging performed by the operator gripping the grip main body and also prevents the operating lever from being inadvertently rotated while the operating member is being operated.

The operator of a crane work machine mounted with a boom hoist drum, a main hoist drum, an auxiliary hoist drum and the like sometimes drives a plurality of drums simultaneously through a combined control of the operating lever. For instance, he may drive the boom hoist drum while also driving the main hoist drum or may drive the auxiliary hoist drum while driving the main hoist drum. It is desirable to ensure that the engine speed can be freely adjusted when controlling the drive of a plurality of drums as described above. However, it is difficult to adjust the engine speed while controlling the drive of a plurality of drums with the operating lever disclosed in the above-identified publication since the operating member is disposed at the grip main body of the swing lever. In addition, if the operating member is inadvertently operated, an undesirable fluctuation of the engine speed will result.

DISCLOSURE OF THE INVENTION

The present invention provides an operating lever device for a construction machine, which adjusts the prime mover rotation rate with ease while commanding the drive of a plurality of actuators and a construction machine having the operating lever device.

The present invention also provides an operating lever device for a construction machine, which does not allow any undesirable fluctuation of the prime mover rotation rate once the prime mover rotation rate has been adjusted and a construction machine having the operating lever device.

An operating lever device for a construction machine according to the present invention comprises a joystick lever used to issue drive commands to a plurality of driving bodies; a grip main body that is mounted at a front end of the joystick lever in such a manner that the grip main body does not rotate relative to the joystick lever; and an operating member that is allowed to rotate relative to the grip main body and is rotated to adjust a prime mover rotation speed.

It is preferable that the operating lever device having the operating member is provided on one of a left side and a right side in an operator's cab of the construction machine. It is preferable that the plurality of driving bodies include a swinging device which supports a revolving superstructure of the construction machine so as to allow the revolving superstructure to swing relative to a traveling structure of the construction machine; and that the operating lever device having the operating member is an operating lever device which controls drive of the swinging device.

The operating lever having the operating member may be provided on each of a left side and a right side in an operator's cab of the construction machine. It is preferable that the plurality of driving bodies include a swinging device which supports a revolving superstructure of the construction machine so as to allow the revolving superstructure to swing relative to a traveling structure of the construction machine; and that one of the operating lever devices located on the left side and the right side in the operator's cab is an operating lever device that controls drive of the swinging device.

It is preferable that the operating member is provided at a top of the grip main body. A collar portion maybe provided at a bottom of the grip main body. It is preferable that the operating member is allowed to rotate around a central axis extending along a longitudinal direction of the grip main body. The grip main body may be a substantially cylindrical shape, and the operating member may be formed as a lid that is a substantially cylindrical shape.

A rotation of the operating member may be limited to a predetermined operating extent, and the predetermined operating extent corresponds to a predetermined maximum prime mover rotation speed. It is preferable to further comprise an operating extent detector that detects an operating extent of the operating member and outputs the detected operating extent to a control device which adjusts the prime mover rotation speed. It is possible that the operating lever device having the operating member further comprises a swing brake switch through which a command for engaging a swing braking device that disallows a swinging motion of the revolving superstructure is issued.

It is possible that a selector switch that switches a prime mover rotation speed command signal from the operating member between a valid state and an invalid state is further provided, and that the prime mover rotation speed command signal from the operating member provided at one of the operating lever devices disposed on the left side and the right side in the operator's cab is set to a valid state in response to a command issued through the selector switch.

It is possible that an altering device that alters characteristics of a prime mover rotation speed command value corresponding to a prime mover rotation speed command signal in conformance to a rotating operation of the operating member is further provided, and that the altering device alters the characteristics of the prime mover rotation speed command value so as to increase the prime mover rotation speed when the operating member located on the left side in the operator's cab is rotated along one direction and also increase the prime mover rotation speed when the operating member located on the right side in the operator's cab is rotated along another direction.

A prime mover rotation speed control system according to the present invention, wherein a prime mover rotation speed command value from an operating lever device for a construction machine, a prime mover rotation speed command value originating from an accelerator pedal and a prime mover rotation speed command value originating from a fuel lever are compared; a largest value among the command values is selected, and prime mover rotation speed is controlled in conformance to the largest value.

An operating lever device for a construction machine according to the present invention comprises: a lever used to issue a drive command for a driving body; a grip main body provided at a front end of the lever in such a manner that the grip main body does not rotate relative to the lever; an operating member that is provided at a top of the grip main body and is operated to adjust a prime mover rotation speed; and a locking member that locks the prime mover rotation speed at the prime mover rotation speed having been set with the operating member.

It is preferable that the operating member and the locking member are formed as an integrated dial and the prime mover rotation speed is set by rotating the dial and the prime mover rotation speed thus set is locked by pressing the dial.

The lever may be a joystick lever through which drive commands are issued to a plurality of driving bodies.

A prime mover rotation speed control system according to the present invention comprises any one of the operating lever devices described above, a prime mover provided in a construction machine; and a control device that controls a rotation speed of the prime mover so as to achieve a rotation speed having been set based upon a prime mover rotation speed command signal set with the operating member provided at the operating lever device.

A construction machine according to the present invention comprises any one of the operating lever devices described above; at least one driving body on which drive control is implemented with the operating lever device; a prime mover; and a control device that adjusts a rotation speed of the prime mover in correspondence to an extent to which the operating member is operated.

BEST MODE FOR CARRYING OUT THE INVENTION

First Embodiment

Figure 6:
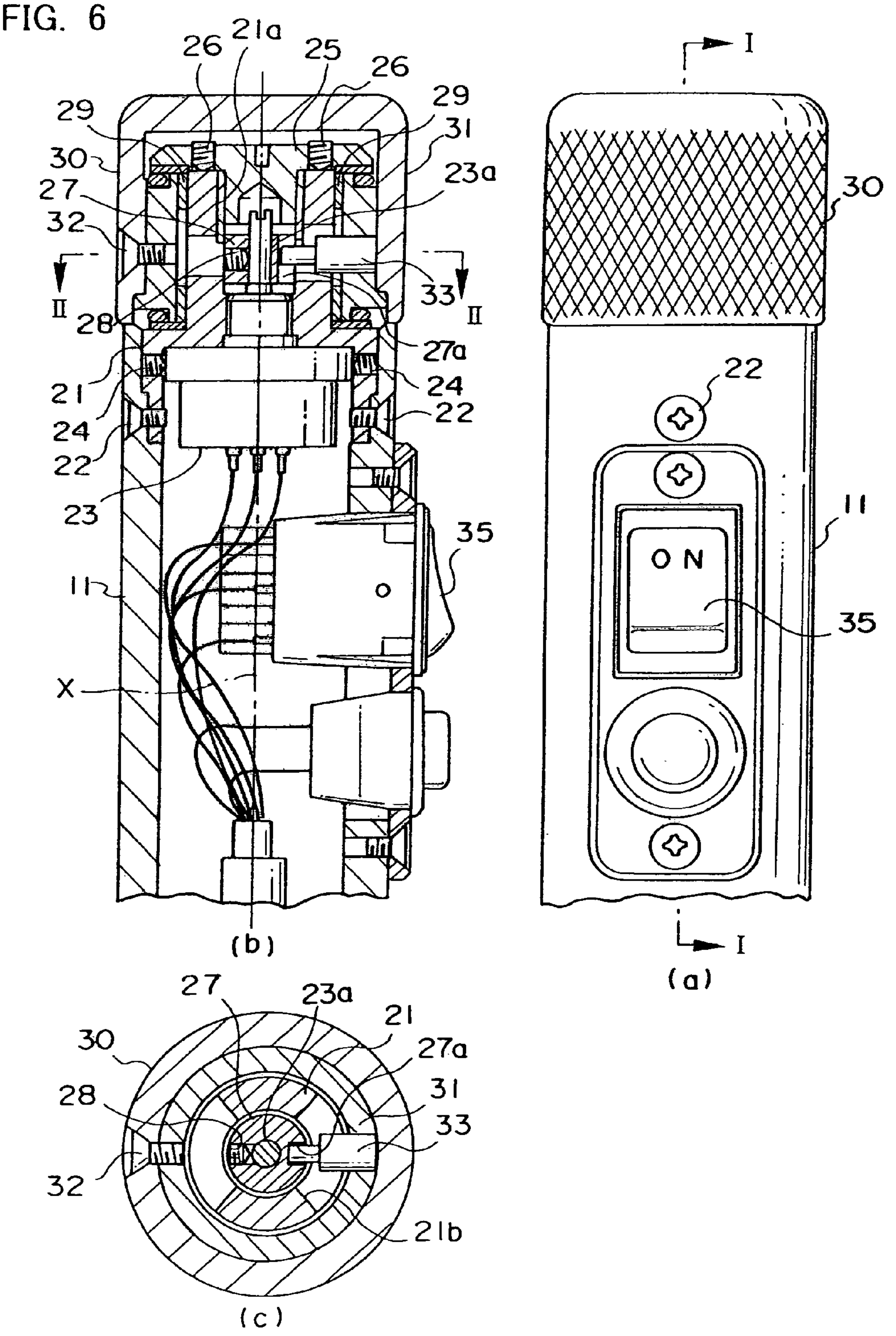
FIG. 6(*a*) is a side elevation of an upper portion of the operating lever achieved in the embodiment of the present invention, FIG. 6(*b*) is a sectional view taken along I-I in FIG. 6(*a*) and FIG. 6(*c*) is a sectional view taken along II-II in FIG. 6(*b*)
Figure 7:
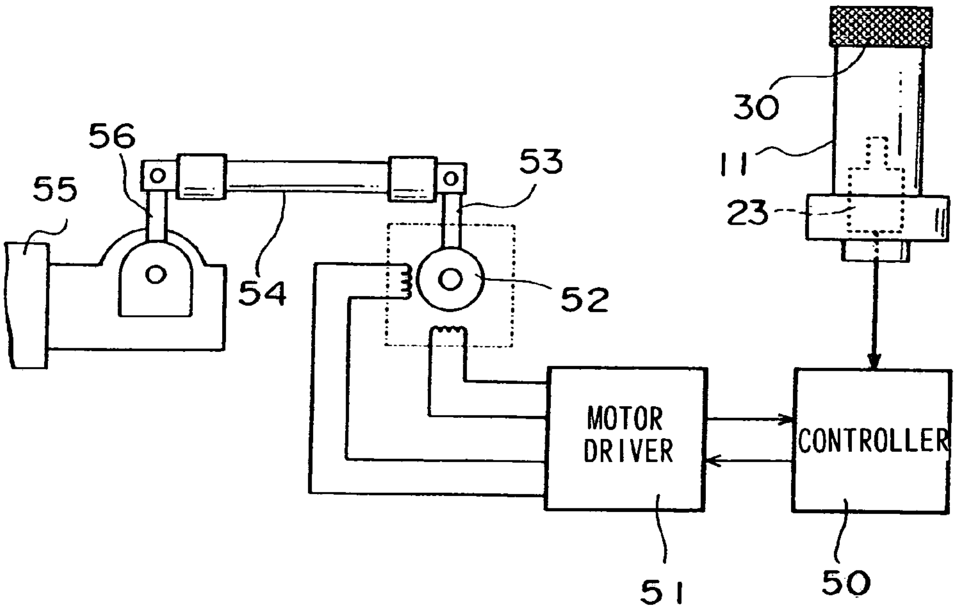
FIG. 7 shows the structure of an engine speed control system.
Figure 8:
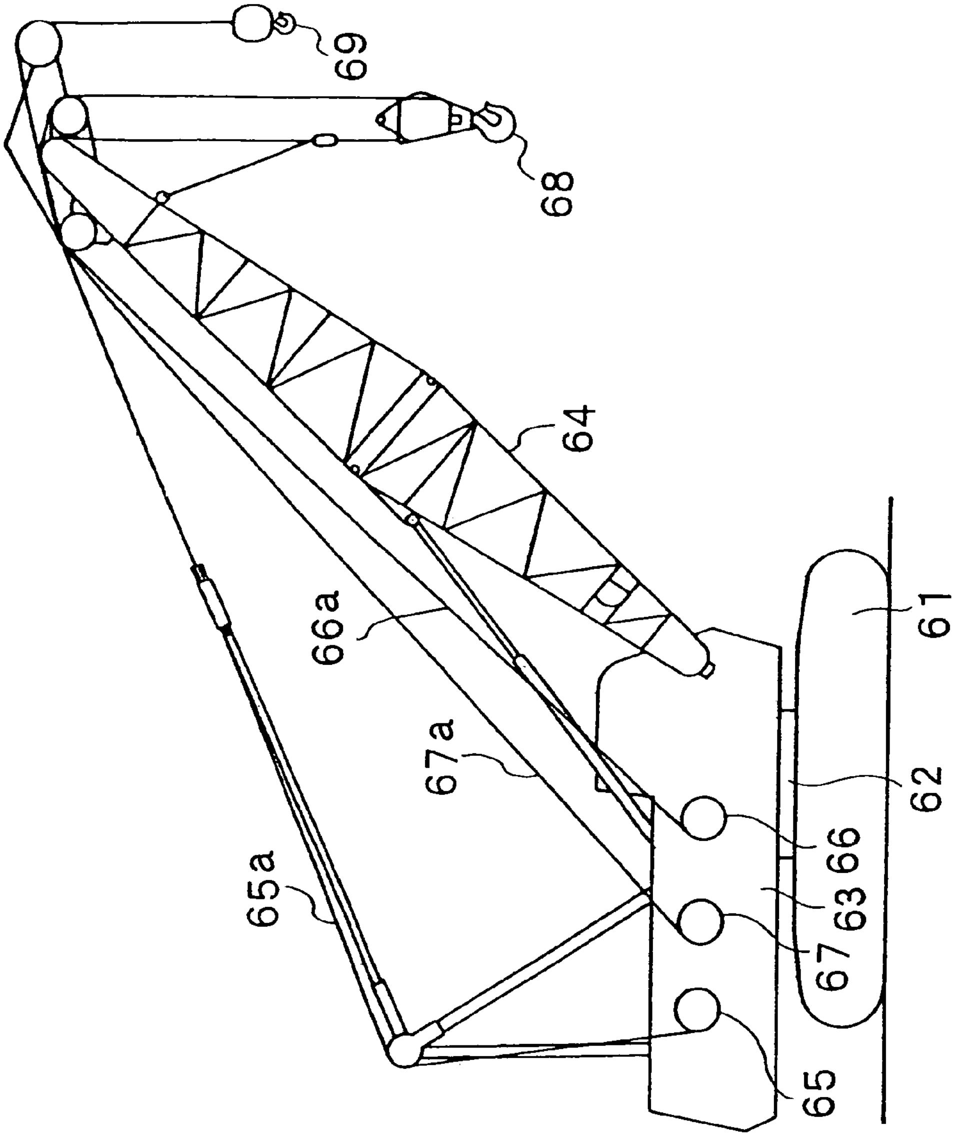
FIG. 8 shows the overall structure of a crawler crane in which the present invention is adopted.

The first embodiment of the present invention is now explained in reference to FIGS. 1 to 8. FIG. 8 is a side elevation of a crawler crane in which operating levers 10 achieved in the first embodiment of the present invention are employed. As shown in FIG. 8, the crawler crane includes a traveling structure or a traveling body 61, a revolving superstructure or a revolving body 63 mounted on the traveling structure 61 so as to be allowed to rotate via a swinging device 62 and a boom 64 supported at the revolving superstructure 63 so as to be allowed to be hoisted up/down. At the revolving superstructure 63, a hoist drum 65, a main hoist drum 66 and an auxiliary hoist drum 67 are mounted. As the main hoist drum 66 is driven, a main hoisting cable **66*a* is taken up/delivered to move a main hook 68 up/down. As the auxiliary hoist drum 67 is driven, an auxiliary hoisting cable 67*a* is taken up/delivered to move an auxiliary hook 69 up/down. In addition, as the boom hoist drum 65 is driven, a hoist cable 65*a* is taken up/delivered to hoist the boom 64** up/down.

Figure 1:
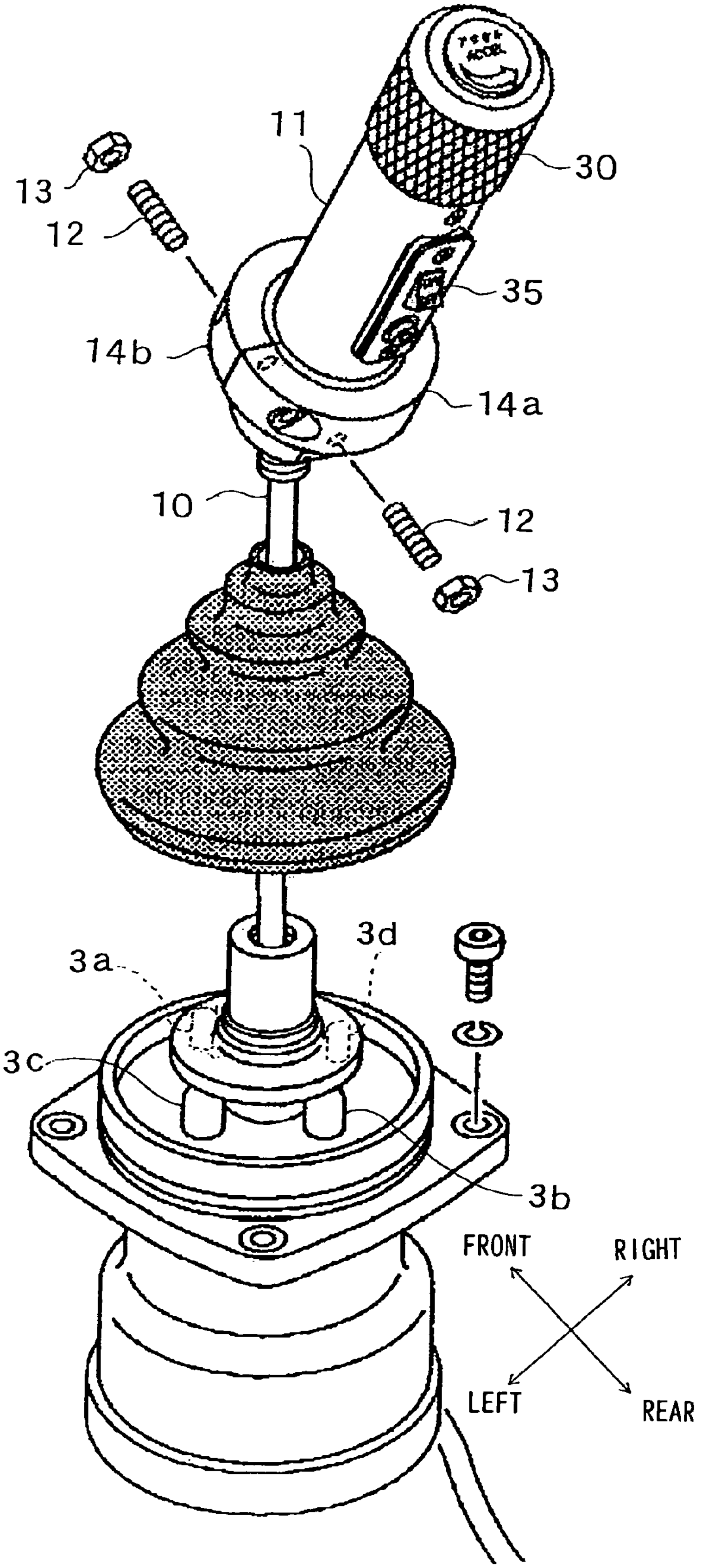
FIG. 1 is a perspective presenting an external view of the operating lever achieved in a first embodiment of the present invention.
Figure 2:
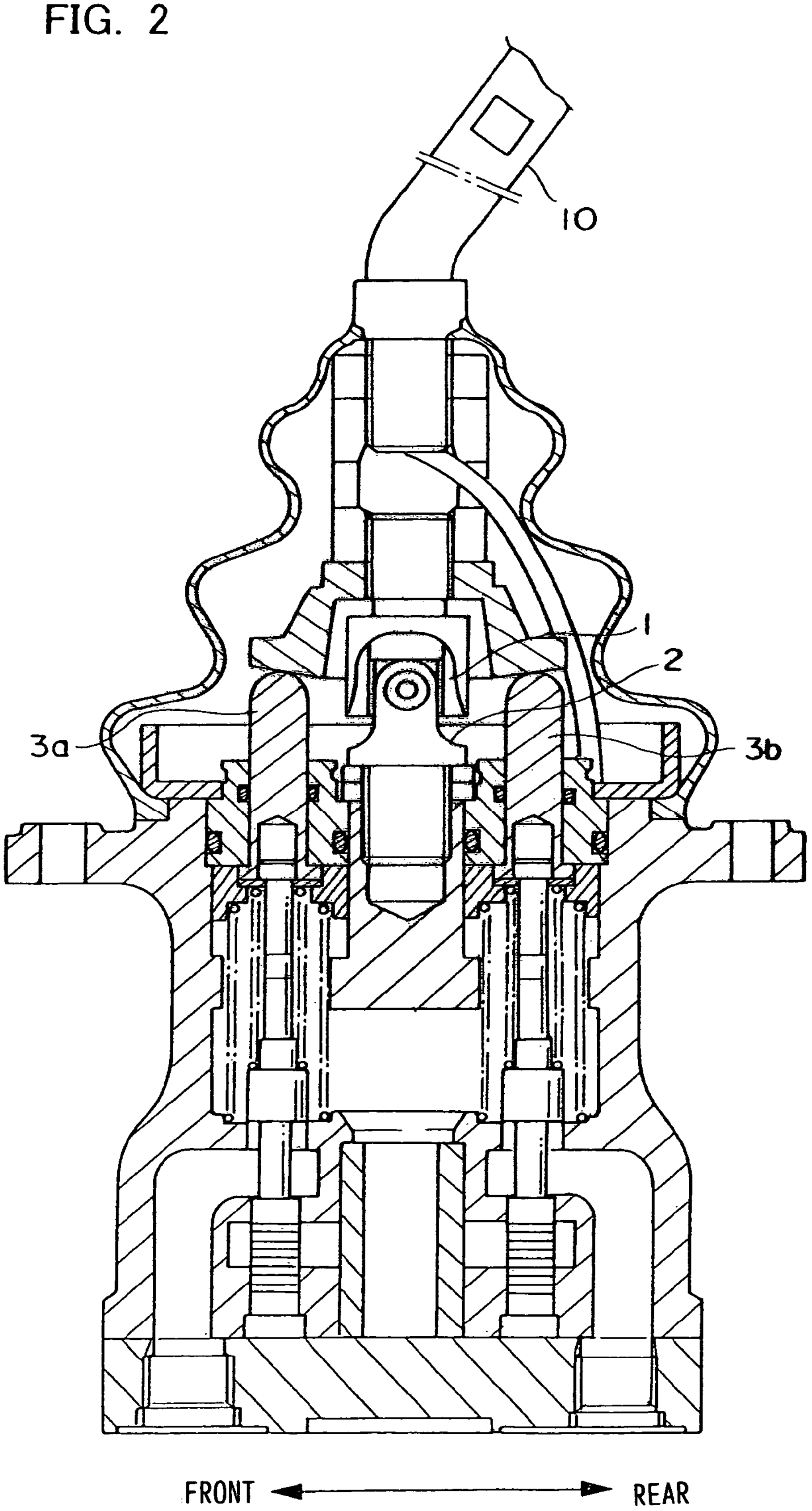
FIG. 2 is a sectional view of amounting portion at which the operating lever shown in FIG. 1 is mounted.

FIG. 1 is a perspective presenting an external view of an operating lever 10 achieved in the first embodiment of the present invention and FIG. 2 is a sectional view of a mounting portion at which the operating lever 10 is mounted. As shown in FIGS. 1 and 2, the operating lever 10 is a joystick lever which is rotatably attached to a fixed member 2 via a universal joint 1. A grip 11 is provided at the front end of the joystick lever 10, and the operator moves or operates the lever 10 by holding the grip 11. At the top of the grip 11, a rotary operating member 30 that can be rotated relative to the grip 11 is provided. The rotary operating member 30 is rotated to adjust an engine speed. And an arrow may be drawn at the top of the rotary operating member 30 to indicate the operating direction of the rotary operating member 30.

At the bottom of the lever 10, spools 3*a* to 3*d* respectively supported by pilot valves 4*a* to 4*d* (see FIG. 4) via springs are disposed to the front and to the rear and to the left and to the right in the figure, in contact with the lower end surface of the lever 10. Thus, as the operating lever 10 is moved, at least one of the spools 3*a* to 3*d* is pressed down in correspondence to the moving direction along which the operating lever 10 is moved and the operating quantity representing the extent to which the operating lever 10 is operated, and the degree of pressure reduction at the pilot valves 4*a* to 4*d* corresponding to the spools 3*a* to 3*d* having been pressed down is controlled. The operation of the lever 10 and the drive of the pilot valves 4*a* to 4*d* are to be described in detail later.

Figure 3:
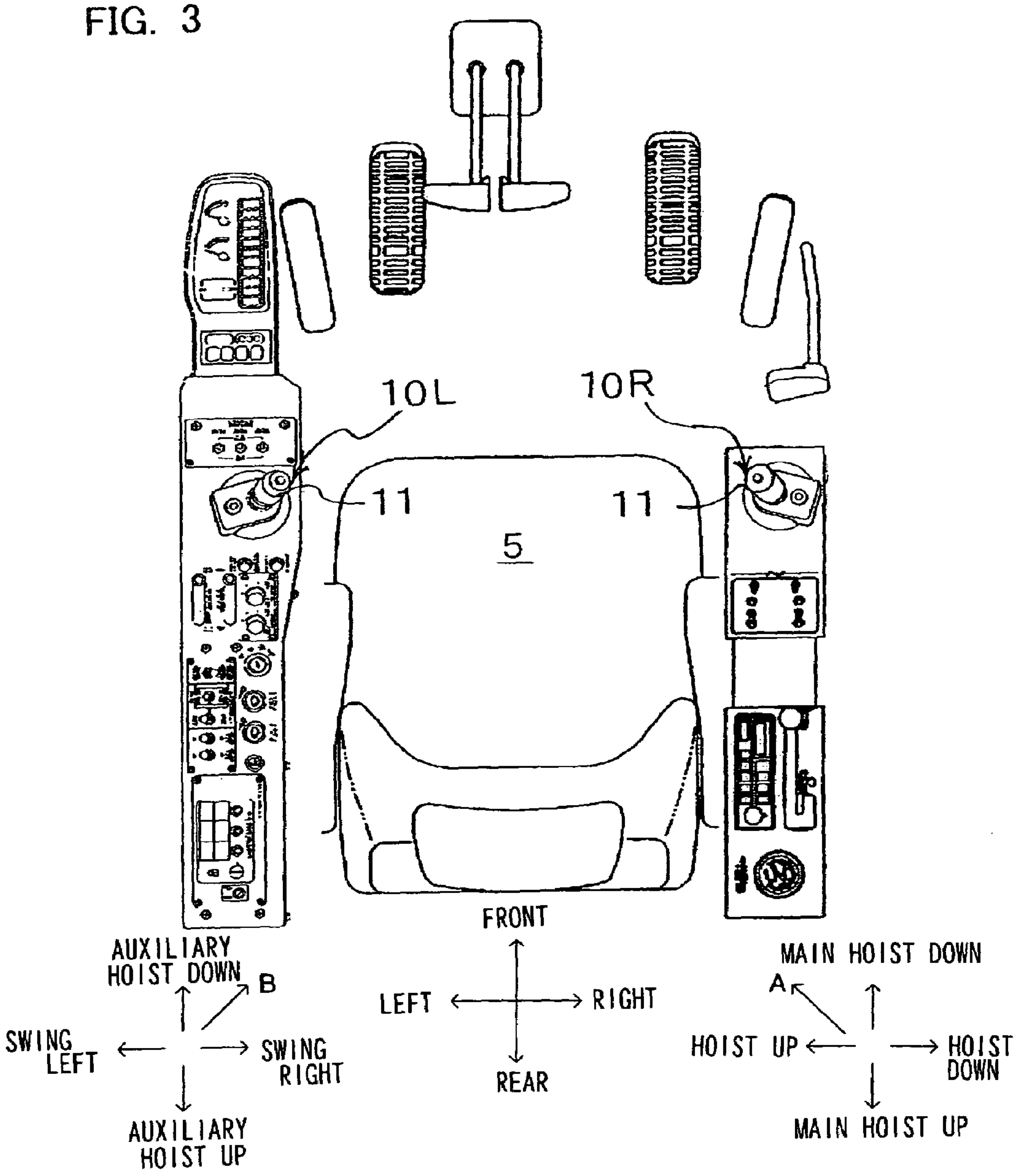
FIG. 3 is a plan view of an operator's cab, showing the positions of the operating levers.

FIG. 3 is a plan view of an operator's cab, showing the positions of the operating levers 10. A joystick lever 10 is disposed on each of the two sides, i.e., the left and right sides of an operator's seat 5, and the grip 11 at the front end of each joystick lever 10 is mounted so as to extend diagonally toward the operator's seat 5 to allow the operator to hold and operate the joystick 10 with ease, as shown in FIG. 1. It is to be noted that the left side operating lever and the right side operating lever are structured identically to each other, and the two operating levers 10 each include the rotary operating member 30. In the following explanation, reference numeral 10L is used to refer to the left side operating lever and reference numeral 10R is used to refer to the right side operating lever.

As shown in FIG. 3, as the left side lever 10L is moved frontward or rearward, the auxiliary hoist drum 67 is taken up or taken down via a hydraulic circuit which is to be described later. If the lever 10L is moved to the left or to the right, the swinging device 62 is driven via the hydraulic circuit to be detailed later, causing the revolving superstructure 63 to swing to the left or to the right. In addition, if the lever 10L is operated frontward by 45° to the right, i.e., along direction B shown in FIG. 3, for instance, the auxiliary hoist drum 67 is taken down and, at the same time, the revolving superstructure 63 is caused to swing to the right. If, on the other hand, the right side lever 10R is moved frontward or rearward, the main hoist drum 66 is taken up or taken down, whereas if the lever 10R is moved to the left or to the right, the boom hoist drum 65 is taken up or taken down. In addition, if the lever 10R is operated frontward by 45° to the left, i.e., along direction A in FIG. 3, for instance, the main hoist drum 66 is taken down and, at the same time, the boom hoist drum 65 is taken up.

Figure 4:
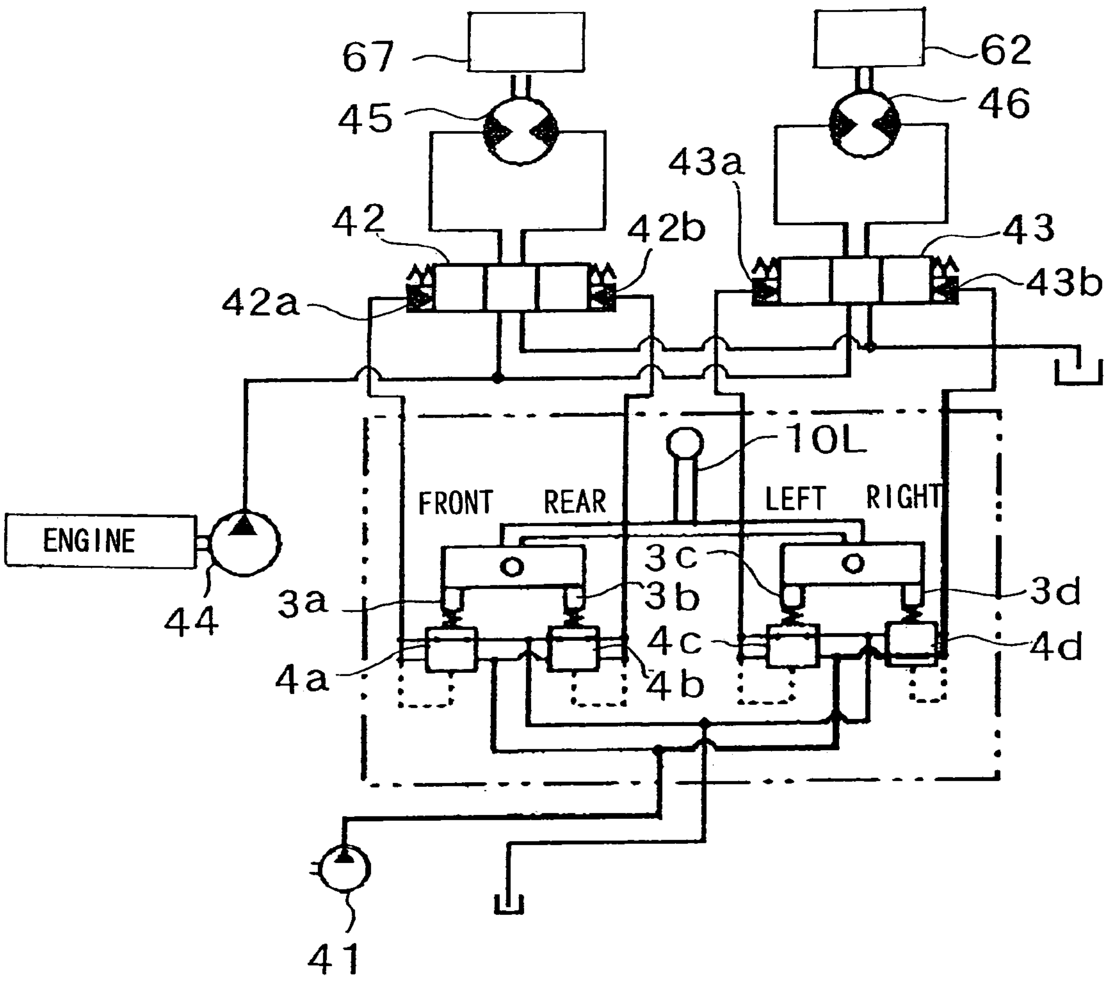
FIG. 4 is a hydraulic circuit diagram of the actuators that are driven by operating the operating lever achieved in the first embodiment of the present invention.

FIG. 4 is a hydraulic circuit diagram of the hydraulic circuit used to drive the auxiliary hoist drum 67 and the swinging device 62 which are driven as the left side lever 10L is moved. It is to be noted that although not shown, a hydraulic circuit used to drive the boom hoist drum 65 and the main hoist drum 66 which are driven by moving the right side lever 10R, too, adopts a structure similar to the hydraulic circuit shown in FIG. 4. As shown in FIG. 4, the hydraulic circuit used to drive the auxiliary hoist drum 67 and the swinging device 62 includes hydraulic motors 45 and 46 which drive the auxiliary hoist drum 67 and the swinging device 62 respectively, a hydraulic pump 44 which supplies pressure oil to the hydraulic motors 45 and 46, direction control valves 42 and 43 which control the directions of the pressure oil supplied from the hydraulic pump 44 to the hydraulic motor 45 and the hydraulic motor 46 respectively and a pilot hydraulic source 41 which supplies pilot pressure to the direction control valves 42 and 43. The pilot hydraulic source 41 is connected individually to pilot ports 42*a*, 42*b*, 43*a* and 43*b* of the direction control valves 42 and 43 via pilot valves 4*a* to 4*d*. The pilot valves 4*a* to 4*d* are driven in correspondence to the operating quantity and the operating direction of the operating lever 10L. It is to be noted that the hydraulic pump 44 is driven by the engine.

For instance, if the operating lever 10L is operated frontward, the spool 3*a* is pressed down and, as a result, the pilot valve 4*a* is driven, whereas if the operating lever 10L is operated rearward, the spool 3*b* is pressed down and the pilot valve 4*b* is driven. If the operating lever 10L is operated to the left, the spool 3*c* is pressed down and, as a result, the pilot valve 4*c* is driven, whereas if the operating lever 10L is operated to the right, the spool 3*d* is pressed down and the pilot valve 4*d* is driven. In addition if the operating lever 10L is operated frontward by a 45° angle to the right, i.e., along direction B in FIG. 3, the spools 3*a* and 3*d* are pressed down at the same time and the pilot valves 4*a* and 4*d* are driven. When a given pilot valve among the pilot valves 4*a* to 4*d* is driven, the pilot pressure from the pilot hydraulic source 41 is applied to the pilot port 42*a*, 42*b*, 43*a* or 43*b* corresponding to the pilot valve having been driven among the pilot valves 4*a* to 4*d*. In conformance to the pilot pressure applied to the pilot port 42*a*, 42*b*, 43*a* or 43*b*, the direction control valve 42 or 43 is switched from the neutral position. As a result, the pressure oil from the hydraulic pump 44 is supplied to the hydraulic motor 45 or 46 via the direction control valve 42 or 43 to drive the auxiliary hoist drum 67 or the swinging device 62.

Figure 5:
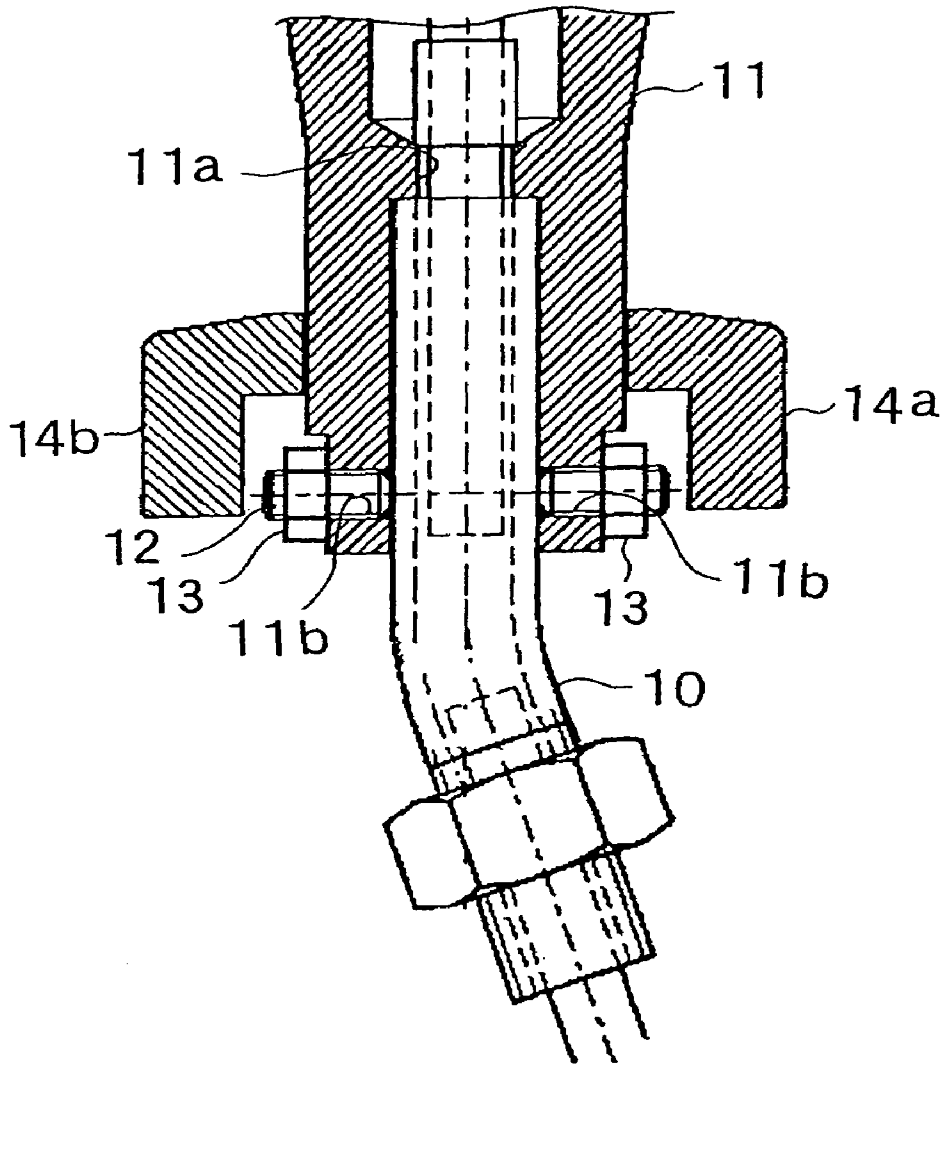
FIG. 5 is a sectional view of a lower portion of the operating lever achieved in the first embodiment of the present invention.

FIG. 5 is a sectional view of a lower portion of the grip 11 mounted at the front end of the lever 10. As shown in FIG. 5, a threaded portion 11*a* is formed at the inner surface of the grip 11 adopting a substantially cylindrical shape, and the front end of the lever 10 is screwed into the threaded portion 11*a*. At the lower end portion of the grip 11, screw holes 11*b* are formed as through holes extending along the lateral direction, i.e., along the radius of the grip 11, and bolts 12 are screwed into the screw holes 11*b*. The bolts 12 are each screwed in until the front end comes in contact with the external circumferential surface of the lever 10 and are each secured with a nut 13. The grip 11 is thus positioned relative to the lever 10 and is locked to the operating lever 10. Namely, the grip 11 is not allowed to rotate relative to the operating lever 10. It is to be noted that two screw holes 11*b* are provided to position the grip 11 at two points, as shown in FIG. 5, in this example.

The grip 11 is clamped at the lower portion of its external circumferential surface by a pair of split ring members 14*a* and 14*b* (see FIG. 1). The split ring members 14*a* and 14*b* form a collar extending outward from the grip 11, and when the operator holds the grip 11, the edge of his hand, i.e., the little finger of his hand, comes in contact with the upper surfaces of the split ring members 14*a* and 14*b*. Thus, the operator can securely hold the grip 11 with ease, and the operability of the lever 10 improves.

The following is an explanation of the internal structure of the grip 11, given in reference to FIGS. 6(*a*) to 6(*c*). FIG. 6(*a*) is a side elevation of an upper portion of the grip 11, FIG. 6(*b*) is a sectional view taken along line I-I in FIG. 6(*a*) and FIG. 6(*c*) is a sectional view taken along line II-II in FIG. 6(*b*). As shown in FIGS. 6(*a*) and 6(*b*), the rotary operating member 30 formed as a lid assuming a substantially cylindrical shape is disposed at the top of the grip 11 assuming a substantially cylindrical shape. A base member 21 is inserted at the upper end of the grip 11 and the base member 21 and the grip 11 are coupled to constitute an integrated unit via screws 22. At the center of the base member 21, a screw hole 21*a* is formed as a through hole. A potentiometer (operating quantity detector) 23 is screwed into the screw hole 21*a* from its lower end, and the potentiometer 23 is fixed onto the base member 21 with bolts 24 that pass through the side surface of the base member 21. In addition, a cover 25 is screwed into the screw hole 21*a* from its upper end and the cover 25 is fixed to the base member 21 with bolts 26.

A potentio-shaft (a shaft of the potentiometer) 23*a* at the front end, i.e., at the upper end, of the potentiometer 23 is inserted at a coupling 27 having a longitudinal notch 27*a*. A pin 33, to be detailed later, is inserted at the notch 27*a*. The coupling 27 and the potentio-shaft 23*a* are locked to each other to form an integrated unit via a bolt 28. Gaps are created between the external circumferential surface of the coupling 27 and the base member 21 and between the front end of the potentio-shaft 23*a* and the cover 25. As a result, the potentio-shaft 23*a* and the coupling 27 are allowed to rotate around an axis X of the grip 11, i.e., around the central axis of the grip extending along the longitudinal direction.

A pipe 31 is attached to the base member 21 via a ball plunger 29 so as to be allowed to rotate around the axis X. The rotary operating member 30 is fitted on the outside of the pipe 31, and the rotary operating member 30 and the pipe 31 are coupled as one via a screw 32. The pin 33 passes through the pipe 31 along the radius of the pipe 31. The front end of the pin 33 passes through a groove hole 21*b* ranging along the circumferential direction over approximately 90° at the side surface of the base member 21 and is inserted at the notch 27*a* at the coupling 27. Thus, the potentio-shaft 23*a* is allowed to rotate together with the coupling 27, the pipe 31 and the rotary operating member 30 via the pin 33. Since the pin 33 moves inside the groove hole 21*b* formed at the side surface of the base member 21, the potentio-shaft 23*a*, the coupling 27, the pipe 31 and the rotary operating member 30 are allowed to rotate only within the 90° range around the axis X and cannot rotate beyond this range.

The potentiometer 23 detects the rotating quantity of the potentio-shaft 23*a* representing the operating quantity of the rotary operating member 30 and outputs a signal corresponding to the detection value. It is to be noted that the rotary operating member 30 is made to stop at the position at which the rotating operation thereof has stopped due to the resistance between the base member 21 and the pipe 31. It is desirable to constitute the rotary operating member 30, which is normally operated by the operator using his fingers, with a non-slippery material.

A swing brake switch 35 is provided at the external circumferential surface of the grip 11. As the swing brake switch 35 is turned on, a swing brake device (not shown) is activated to prevent an undesirable swing of the revolving superstructure 63 which may be caused by its own weight on a slope or the like. A signal line extending from the potentiometer 23 and the like passes through the centers of the grip 11 and the operating lever 10, is taken out through the base end of the operating lever 10 and is connected to a controller 50 (see FIG. 7).

FIG. 7 is a block diagram of the engine speed control implemented in conformance to the operating quantity of the rotary operating member 30. The controller (rotation rate control device) 50 reads the rotating quantity of the potentio-shaft 23*a* detected by the potentiometer 23, i.e., the operating quantity of the rotary operating member 30. Then, the controller 50 outputs a command for a motor driver 51 to drive a stepping motor 52 in correspondence to the operating quantity of the rotary operating member 30. As the stepping motor 52 is driven, a control lever 56 of an engine governor 55 is rotated via a rod 53 and a link 54 and the engine speed is altered. As a result, the engine speed can be controlled freely in correspondence to the operating quantity of the rotary operating member 30. It is to be noted that the controller 50 outputs a command to the motor driver 51 so as to achieve a preset maximum engine speed when the potentio-shaft 23*a* has rotated by 90°.

Next, the operations which characterize the embodiment of the present invention, executed when operating the crawler crane to hoist the boom, take up/down the hooks 68 and 69 and the like are explained. These crane operations are performed while the operator holds the grips 11 of the operating levers 10L and 10R with his left hand and right hand respectively. It is to be noted that the rotary operating member 30 is provided at each of the left and right levers 10L and 10R.

First, the boom hoisting operation and the take up/down operation of the main hook 68 are explained. As the operator moves the lever 10R frontward or rearward with his right hand, the main hoist drum 66 is driven to take up/down the main hook 68, whereas as the operator moves the lever 10R to the left or to the right, the boom hoist drum 65 is driven to hoist up/down the boom 64, as explained earlier. In addition, if the lever 10R is operated along a diagonal direction, the main hoist drum 66 and the boom hoist drum 65 are driven at the same time.

Since the rotary operating member 30 is located at the front end of the grip 11, as described earlier, the operator operating the lever 10R by holding the grip 11 is not allowed to inadvertently rotate the rotary operating member 30. In particular, if the operator holds the grip 11 while keeping the side of the little finger of his right hand in contact with the split ring members 14*a* and 14*b*, the right hand is settled in a stable manner to prevent an erroneous operation of the rotary operating member 30 and to facilitate the operation of the lever 10R. As a result, any undesirable change in the engine speed is prevented and, at the same time, the crane operation can be performed smoothly.

It is to be noted that if the lever 10L is moved to the left or to the right with the left hand while the operator is operating the lever 10R with his right hand, the swinging device 62 is driven causing the revolving superstructure 63 to swing. Thus, a swinging operation can be performed concurrently during the boom hoisting operation and the take up/down operation of the main hook 68.

If the rotary operating member 30 provided at, for instance, the lever 10L is rotated with the left hand when hoisting the boom and taking up/down the main hook 68, the engine speed is controlled in correspondence to the operating quantity of the rotary operating member 30, as described above. In this situation, the grip 11 itself does not rotate relative to the lever 10L, and thus, the operator can operate the rotary operating member 30 with, for instance, his thumb and index finger with ease while holding the grip 11. Especially, by holding the grip 11 while keeping the side of the little finger of his left hand in contact with the split ring members 14*a* and 14*b*, the operator's left hand can be held in a stable manner to allow the operator to operate the rotary operating member 30 with the fingers of his left hand with ease. This eliminates the need for the operator to twist his wrist to operate the rotary operating member 30, and since an inadvertent rotation of the lever 10L is prevented, no undesirable swinging operation or take up/down operation of the auxiliary hook 69 is performed against the operator's wishes.

Since the rotary operating member 30 is allowed to rotate only over the 90° range and the control is implemented to set the engine speed to the predetermined maximum rotation rate when the potentio-shaft 23*a* is rotated by 90°, the operator can control the engine speed up to the maximum rotation rate without having to adjust his hold on the grip 11. It is to be noted that the rotary operating member 30 provided at the lever 10R may be rotated with a finger of his right hand. In such a case, the boom hoist drum 65 and the main hoist drum 66 can be driven and the engine speed can be adjusted at the same time with the right hand alone.

Next, a situation in which the operator performs an auxiliary hook take up operation in combination with the crane operations described above is explained. As the operator moves the lever 10L frontward or rearward with his left hand, the auxiliary hoist drum 67 is driven and the auxiliary hook 69 is taken up/down. In addition, if the operator operates the lever 10L diagonally, the revolving superstructure 63 is made to swing concurrently while the auxiliary hook 69 is taken up/down. By moving the right lever 10R and also rotating the rotary operating member 30 with one finger of the right hand or the left hand at this time, the drive of the individual drums 65 to 67 and the drive of the swinging device 62 and the adjustment of the engine speed can be achieved all at once.

Figure 9:
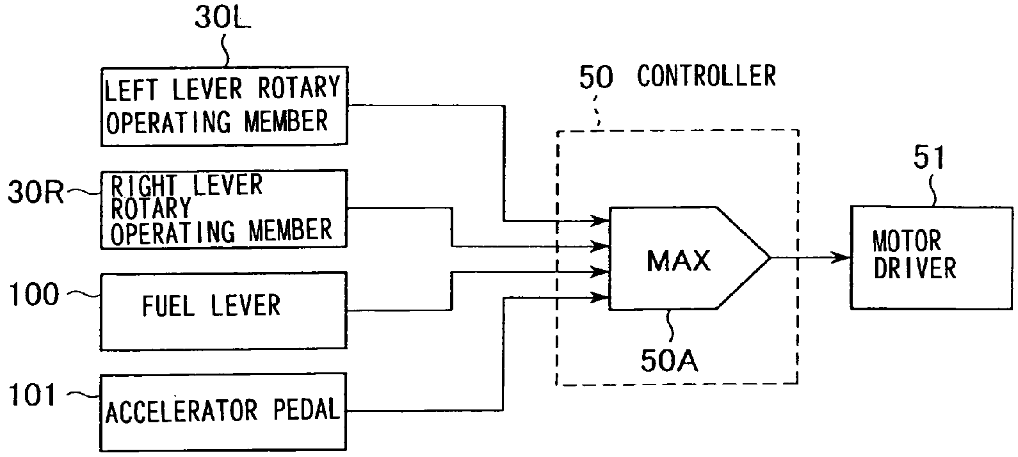
FIG. 9 is a conceptual diagram of the engine speed control.

It is to be noted that the engine speed can be also controlled through a pedal operation or a fuel lever operation. If the rotary operating members 30 provided at the left and right levers 10L and 10R, the accelerator pedal and the fuel lever are operated all at once, the engine speed control is executed as explained below. FIG. 9 presents a conceptual diagram of the engine speed control.

As shown in FIG. 9, a rotation speed command value corresponding to the operation of the rotary operating member 30L at the left lever 10L, a rotation speed command value corresponding to the operation of the rotary operating member 30R at the right lever 10R, a rotation speed command value corresponding to the operation of a fuel lever 100 and a rotation speed command value corresponding to the operation of an accelerator pedal 101 are input to a maximum selector circuit 50A of the controller 50. The maximum selector circuit 50A compares the rotation speed command values input thereto and selects the largest value among them. The rotation speed command value selected at the maximum selector circuit 50A is output to the motor driver 51 and thus, the engine speed is controlled to achieve a rotation rate corresponding to the command value. As described above, if commands with regard to the engine speed are output by a plurality of operating members, the largest value among the rotation speed command values is selected and the engine speed is implemented in conformance to the largest value.

VARIATION EXAMPLE 1 OF THE FIRST EMBODIMENT

Figure 10:
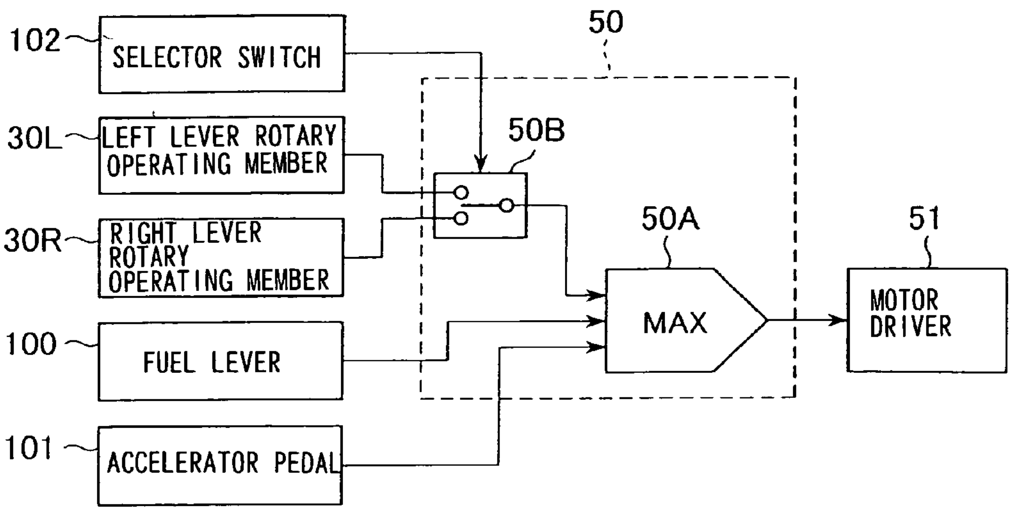
FIG. 10 is a conceptual diagram of the engine speed control.

Only the signal from one of the rotary operating members 30L and 30R at the left lever 10L and the right lever 10R may be used as a valid signal. For instance, either the lever 10L or the lever 10R may be selected in accordance with the operator's preference to implement the engine speed control by using the rotation speed command value reflecting the operation of the rotary operating member at the selected lever. FIG. 10 presents a conceptual diagram of this engine speed control.

As shown in FIG. 10, the rotation speed command value from the left lever rotary operating member 30L and the rotation speed command value from the right lever rotary operating member 30R are both input to a switching circuit 50B. The switching circuit 50B, which is switched in response to an operation of a selector switch 102, outputs the command value from the rotary operating member 30L at the left lever 10L or the rotary operating member 30R at the right lever 10R to the maximum selector circuit 50A. The maximum selector circuit 50A compares the rotation speed command value from the switching circuit 50B, the rotation speed command value from the fuel lever 100 and the rotation speed command value from the accelerator pedal 101 and selects the largest value among them. The rotation speed command value selected at the maximum selector circuit 50A is output to the motor driver 51 and thus, the engine speed is controlled to achieve a rotation rate corresponding to the command value.

As described above, either one of the left rotary operating member 30L and the right rotary operating member 30R can be selected. As a result, the rotary operating member better suiting the preference of the operator or ergonomic consideration can be selected to improve the operability.

VARIATION EXAMPLE 2 OF THE FIRST EMBODIMENT

Figure 11:
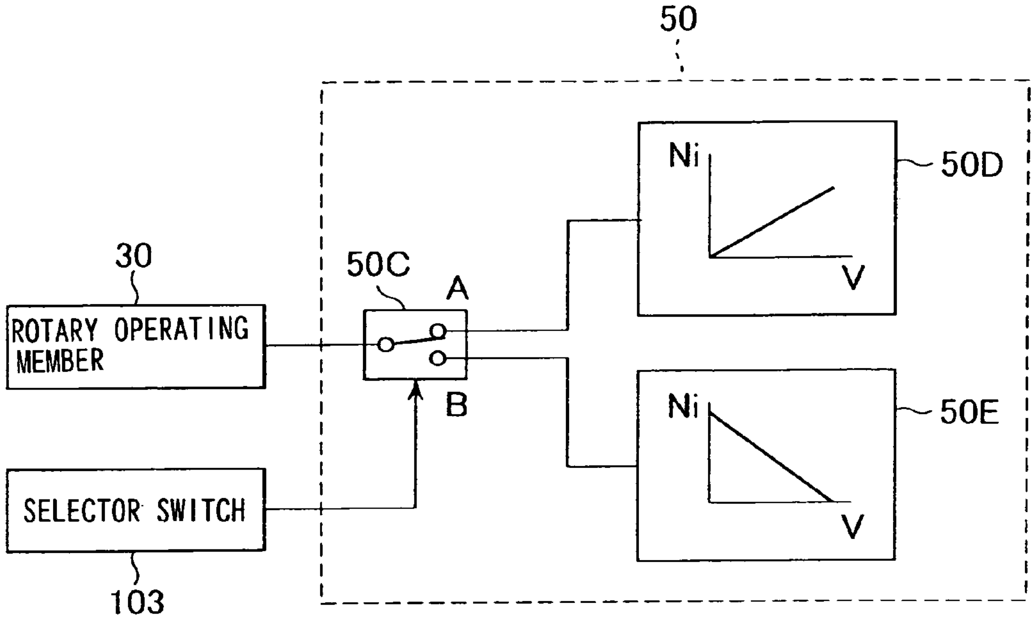
FIG. 11 is a conceptual diagram of the control implemented to switch the engine rotation command in correspondence to the direction along which a rotary operating member is operated.

The direction along which the left rotary operating member 30L is operated to increase the engine speed may be reversed from the direction along which the right rotary operating member 30R is operated to increase the engine speed. FIG. 11 presents a conceptual diagram of a control implemented to switch the engine speed command in conformance to the direction along which a given rotary operating member 30 is operated. It is assumed that when the rotary operating member 30 is operated counterclockwise, the level of the voltage indicated by the voltage signal output by the rotary operating member 30 increases.

As shown in FIG. 11, the voltage signal from the rotary operating member 30 is input to a switching circuit 50C. A switch occurs from a contact point A to a contact point B or vice versa in response to an operation of a selector switch 103. A function generator 50D is connected to the contact point A of the switching circuit 50C, whereas a function generator 50E is connected to the contact point B. A relationship whereby the rotation speed command value Ni increases as the voltage V becomes higher, as shown in the figure is set in advance at the function generator 50D. At the function generator 50E, on the other hand, a relationship whereby the rotation speed command value Ni becomes smaller as the voltage V becomes higher, as shown in the figure, is set in advance. The function generators 50D and 50E each output the rotation speed command value Ni corresponding to the voltage V to the maximum selector circuit 50A shown in FIG. 9 or the switching circuit 50B shown in FIG. 10.

If the rotary operating member 30 is located on the left side in the operator's cab, the switching circuit 50C is switched to the contact point A with the selector switch 103. As the rotary operating member 30 is operated counterclockwise, i.e., along the direction in which the thumb of the left hand holding the grip 11 is pushed outward, at this setting, the engine speed increases. If the rotary operating member 30 is located on the right side in the operator's cab, the switching circuit 50C is switched to the contact point B with the selector switch 103. As the rotary operating member 30 is operated clockwise, i.e., along the direction in which the thumb of the right hand holding the grip 11 is pushed outward, at this setting, the engine speed increases.

When the direction along which the left rotary operating member 30L is operated to increase the engine speed and the direction along which the right rotary operating member 30R is operated to increase the engine speed are set opposite from each other as described above, the operator can operate the left and right rotary operating members 30L and 30R in a natural manner. In addition, since the characteristics of the rotation speed command value corresponding to the output voltage from a rotary operating member 30 are switched by the switching circuit 103, the left and right levers 10L and 10R can be constituted by using identical parts. As a result, advantages such as a cost reduction and simplification of the assembly process can be achieved.

It is to be noted that the engine speed may be made to increase by operating the left rotary operating member 30L clockwise and operating the right rotary operating member 30R counterclockwise, instead. The operating direction of each rotary operating member 30 should be set when assembling the operating lever 10. However, the operating direction may be later switched by the operator to better suit his preference by operating the selector switch 103.

VARIATION EXAMPLE 3 OF THE FIRST EMBODIMENT

Figure 12:
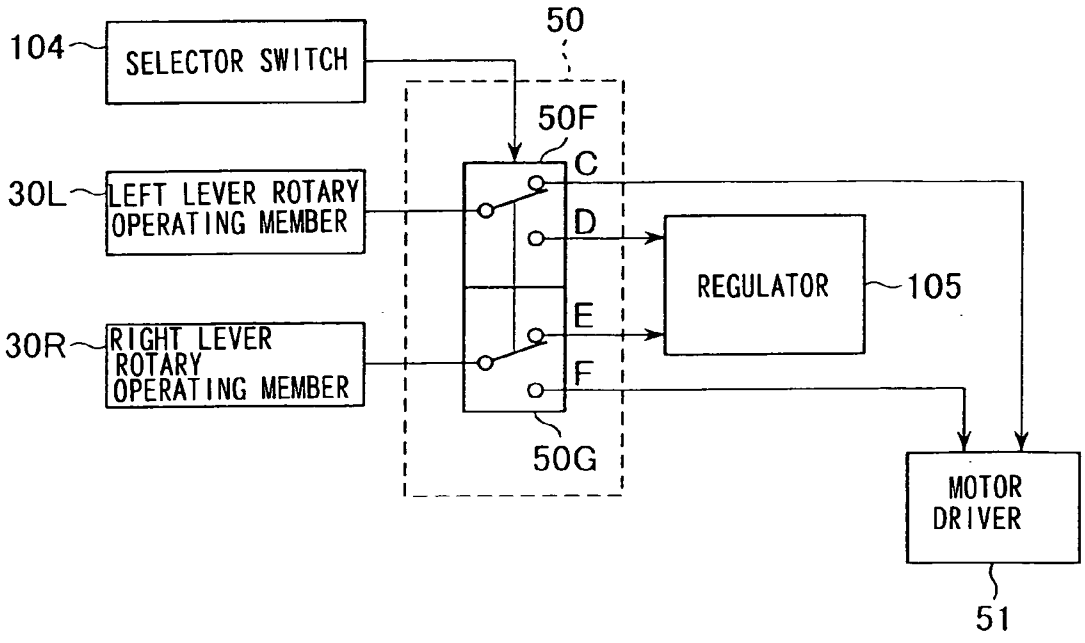
FIG. 12 is a conceptual diagram of the engine speed control and a tilting amount control.

The rotary operating member 30 provided at a given operating lever 10 can be also used to control the tilting amount of a hydraulic pump as well as to control the engine speed. FIG. 12 presents a conceptual diagram of the engine speed control and the tilting amount control. It is to be noted that the explanation below is given by assuming that the engine speed is not controlled via the fuel lever 100 or the accelerator pedal 101 for simplification.

As shown in FIG. 12, signals from the left and right rotary operating member 30L and 30R are respectively input to switching circuits 50F and 50G. A terminal C of the switching circuit 50F and a terminal F of the switching circuit 50G are connected to the motor driver 51, whereas a terminal D of the switching circuit 50F and a terminal E of the switching circuit 50G are connected to a regulator 105 which controls the tilting amount or displacement amount of the hydraulic pump. The switching circuits 50F and 50G are switched by interlocking with each other in response to an operation of a selector switch 104.

For instance, as the switching circuit 50F is switched to the terminal C via the selector switch 104, the switching circuit 50G is switched to the terminal E. As a result, the engine speed control is implemented in response to the operation of the left lever rotary operating member 30L and the regulator 105 is controlled in response to the operation of the right lever rotary operating member 30R to control the tilting amount of the hydraulic pump. If, on the other hand, the switching circuit 50F is switched to the terminal D via the selector switch 104, the switching circuit 50G is switched to the terminal F. As a result, the engine speed control is implemented in response to the operation of the right lever rotary operating member 30R and the regulator 105 is controlled in response to the operation of the left lever rotary operating member 30L to control the tilting amount of the hydraulic pump.

As described above, the tilting amount of the hydraulic pump can be adjusted by using the rotary operating member 30 provided at an operating lever 10. As a result, it becomes possible to adjust with ease the tilting amount as well as to control the engine speed while operating a plurality of actuators, which is particularly useful when, for instance, the construction machine is running at very low speed.

It is to be noted that the rotary operating members may be set in advance so as to control the engine speed with the left lever rotary operating member 30L and control the tilting amount with the right lever rotary operating member 30R or vice versa.

While the rotary operating member 30 is provided at each of the left and right operating levers 10L and 10R in the first embodiment explained above, the rotary operating member 30 may be provided only at one of the operating levers. In such a case, the number of required parts is reduced. It is to be noted that since the engine speed does not need to be adjusted very often during a swinging operation, the rotary operating member 30 is provided preferably at the left lever 10L through which a command for the swinging operation is issued. Since this allows the engine speed to be adjusted by the operator operating the rotary operating member 30 at the left lever 10L with his left hand while driving the main hoist drum 66 and the boom hoist drum 65 through an operation of the right lever 10R, good operability is assured.

It is to be noted that the number of operating levers 10 does not need to be two. In addition, the operating levers 10 may be positioned to the front of the operator's seat 5 instead of on the left and right sides of the operator's seat 5. Furthermore, as long as the operating levers 10 are each constituted of a single joystick lever capable of outputting drive commands to a plurality of driving bodies, the shape and the internal structure of the operating levers 10 are not limited to those explained in reference to the embodiment.

As long as the rotary operating member 30 can be rotated around the axis X of the grip with ease by the operator, it does not need to be formed as a lid assuming a substantially cylindrical shape. For instance, instead of a lid shape, the rotary operating member 30 may assume a simple substantially cylindrical shape and, in such a case, a lid may be fitted at the top of the rotary operating member 30. In addition, the angular range over which the rotary operating member 30 is allowed to rotate may be set to a value other than 90°. In this case, too, it is desirable to set a predetermined maximum value of the engine speed in correspondence to the maximum operating angle over which the rotary operating member 30 can be operated.

Figure 13:
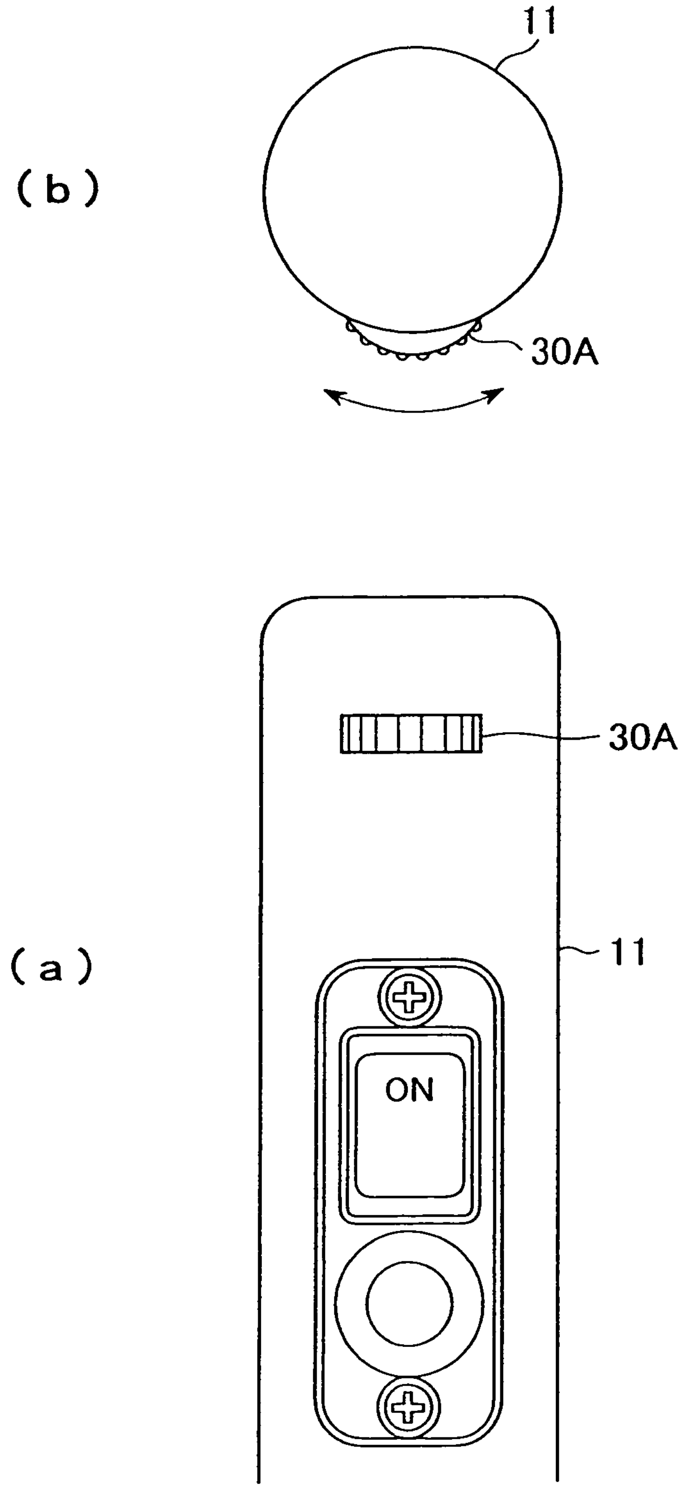
FIG. 13(*a*) is a top view of an operating lever and FIG. 13(*b*) is a side elevation of an upper portion of the operating lever.
Figure 14:
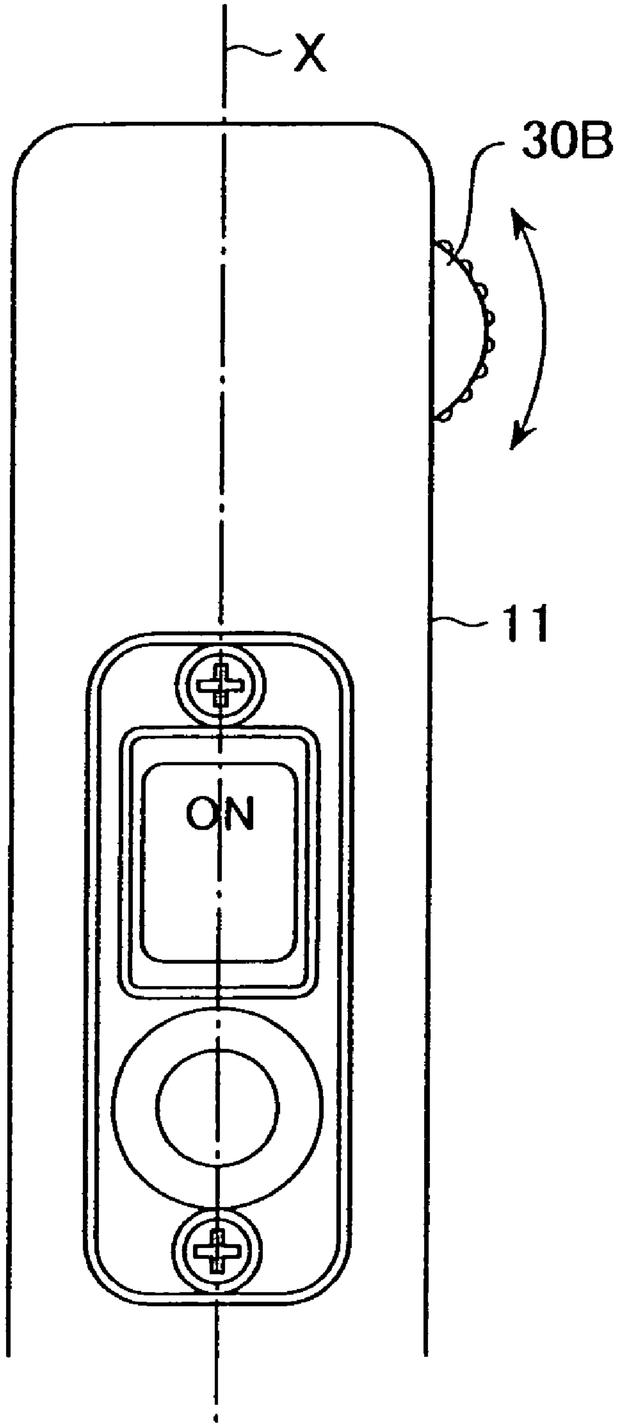
FIG. 14 is a side elevation of an upper portion of an operating lever.
Figure 15:
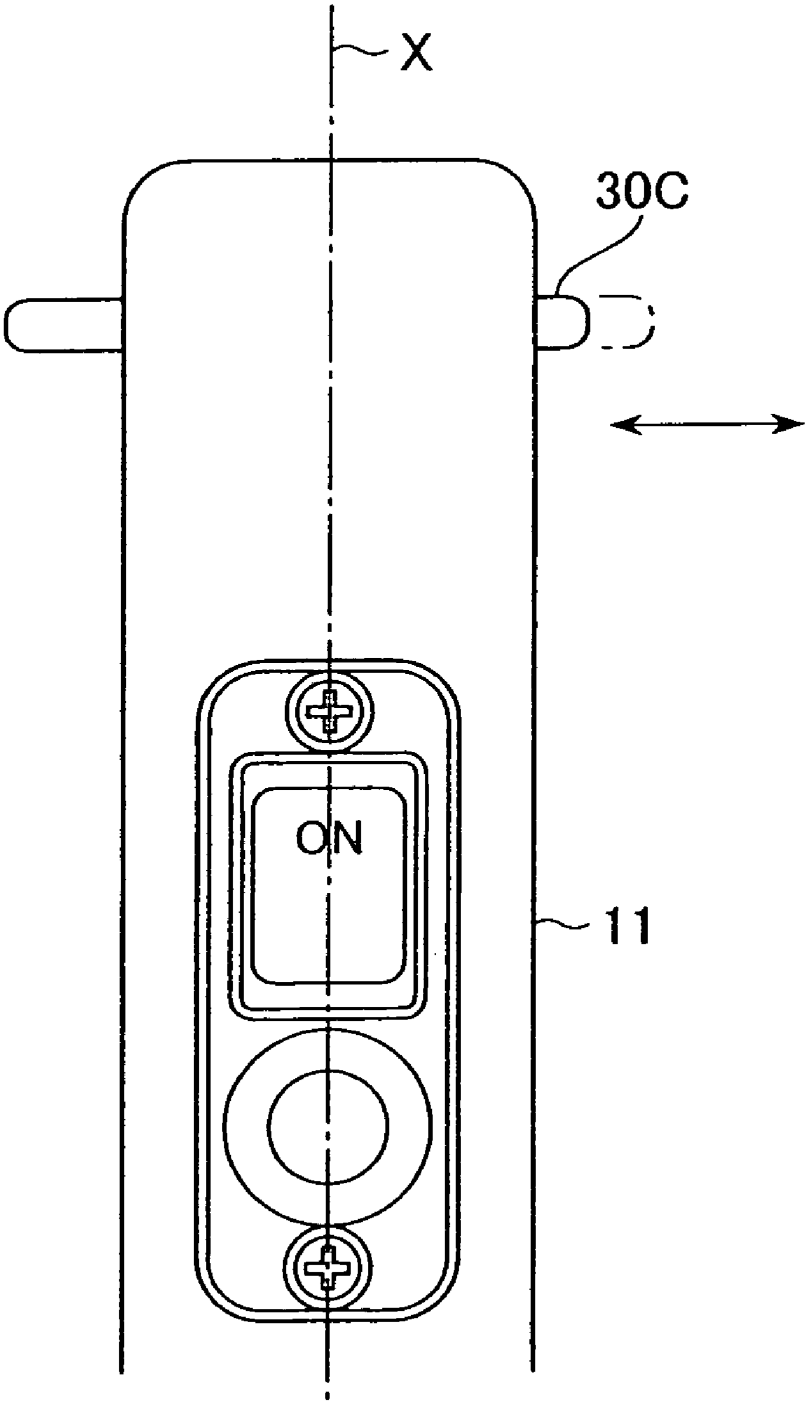
FIG. 15 is a side elevation of an upper portion of an operating lever.

Moreover, the engine speed may also be controlled by using an operating member that does not rotate around the axis X of the grip 11. FIGS. 13 to 15 each present a sectional view of an upper portion of a grip 11 having a rotary operating member achieved in another mode. For instance, a dial 30A may be set in an upper area of the grip 11 in place of the rotary operating member 30, as shown in FIGS. 13(*a*) and 13(*b*). As shown in FIG. 13(*b*), the dial 30A protrudes slightly further outward relative to the surface of the grip 11, and thus, the operator can operate the dial 30A with ease with his thumb or the like while holding the grip 11. As the dial 30A is rotated along either of the directions indicated by the arrows in the figure, a voltage signal corresponding to the operating quantity of the dial 30A is output to the controller 50. The controller 50 then controls the engine speed as described earlier in conformance to the voltage signal.

Instead of the rotary operating member 30, a dial 30B may be provided at the upper circumferential surface of the grip 11, as shown in FIG. 14. As the dial 30B rotated along either of the directions indicated by the arrows in the figure, i.e., as the dial 30B is rotated along the axis X, a voltage signal corresponding to the operating quantity of the dial 30B is output to the controller 50.

Alternatively, a slide switch 30C may be provided at an upper portion of the grip 11 instead of the rotary operating member 30, as shown in FIG. 15. As the slide switch 30C is operated along either of the directions indicated by the arrows in the figure, i.e., along a direction substantially perpendicular to the axis X, a voltage signal corresponding to the operating quantity of the slide switch 30C is output to the controller 50.

Figure 16:
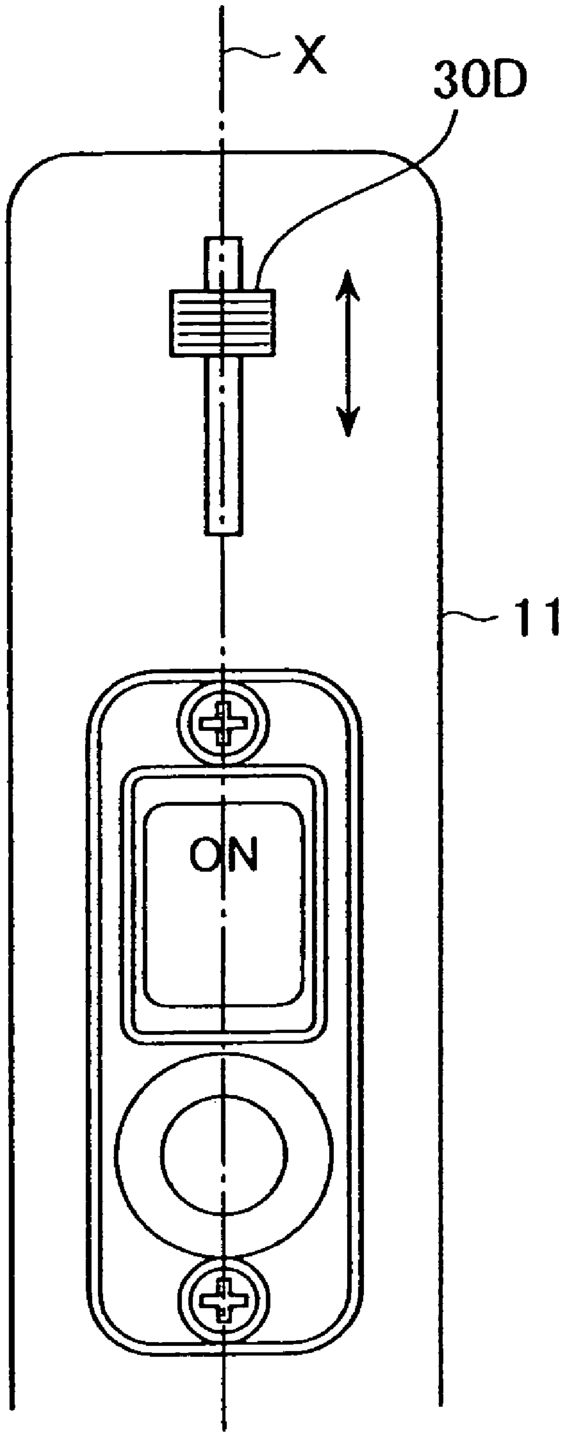
FIG. 16 is a side elevation of an upper portion of an operating lever.

Or, a slide switch 30D may be provided at an upper portion of the grip 11 instead of the rotary operating member 30, as shown in FIG. 16. As the slide switch 30D is operated along either of the directions indicated by the arrows in the figure, i.e., along a direction of the axis X, a voltage signal corresponding to the operating quantity of the slide switch 30D is output to the controller 50.

As explained above, a grip 11 is provided at the front end of the joystick lever 10, through which drive commands for a plurality of driving bodies such as the boom hoist drum 65, the main hoist drum 66, the auxiliary hoist drum 67 and the swinging device 62 are issued in such a manner that the grip 11 is not allowed to rotate relative to the joystick lever 10 and a rotary operating member 30 is provided so as to be allowed to rotate relative to the grip 11 in the first embodiment of the present invention. By rotating the rotary operating member 30, the engine speed can be adjusted with ease while issuing commands for driving the plurality of driving bodies.

By providing the joystick lever 10 having the rotary operating member 30 on either the left side or the right side in the operator's cab of a construction machine, the number of required parts can be reduced. If the rotary operating member 30 is provided at the operating lever used to operate the swinging device 62 which drives the revolving superstructure 62 for a swinging operation, the operability is improved. The operability can also be improved by providing the joystick lever 10 having the rotary operating member 30 on each of the two sides, i.e., the left side and the right side, in the operator's cab.

By disposing the rotary operating member 30 at the top of the grip 11, an undesirable change in the engine speed resulting from an erroneous operation of the rotary operating member 30 during a crane operation can be prevented. In addition, the presence of the collar portions 14*a* and 14*b* at the bottom of the grip 11 allows the operator to hold the grip 11 in a stable manner and ultimately to operate the lever 10 with great ease.

The rotary operating member 30, which is allowed to rotate around the axis X at the center of the operating lever 10 along the longitudinal direction, can easily be operated with operator's fingers. In addition, since the grip 11 itself does not rotate relative to the operating lever 10, the rotary operating member 30 can be operated without inadvertently operating the lever 10. Since the grip 11 and the rotary operating member 30 are both formed in a substantially cylindrical shape, good operability is assured. By restricting the rotation of the rotary operating member 30 so that the rotary operating member 30 can never be turned beyond a predetermined operating quantity, e.g. , 90°, corresponding to a predetermined maximum engine speed, the engine speed can be controlled up to the maximum value without having to adjust the hold on the grip 11.

The rotation speed command value from the rotary operating member 30, the rotation speed command value from the fuel lever 100 and the rotation speed command value from the accelerator pedal 101 are compared with one another, the largest value among them is selected and the engine speed control is implemented in correspondence to the selected value. By adopting this method, it is ensured that the engine speed control is implemented smoothly even when engine speed commands are output via a plurality of operating members.

The operating lever 10 constituted of a joystick lever is installed in the construction machine, drive commands are output to a plurality of actuators via the operating lever 10 and a command for an engine speed adjustment is issued via the rotary operating member 30 provided at the operating lever 10. The controller 50 then controls the engine speed in conformance to the command from the rotary operating member 30, i.e., in conformance to the operating quantity of the rotary operating member 30. As a result, the construction machine can be operated smoothly.

It goes without saying that a rotary operating member 30 such as that described above may be provided at a standard operating lever which is not a joystick lever to control the engine speed and/or the pump tilting amount. However, by providing the rotary operating member 30 described above at a joystick lever that can be operated along various directions, the engine speed control can be implemented even more effectively while preventing any erroneous operation of the rotary operating member 30.

Since the engine speed is controlled to achieve the rotation rate having been set based upon the prime mover rotation speed command signal set with the operating member 30, the construction machine can be operated smoothly.

Second Embodiment

In the second embodiment, the engine speed having been adjusted by using a rotary operating member such as that described above is then locked to sustain the rotation speed. The following is an explanation of the second embodiment of the present invention, given in reference to the drawings.

Figure 17:
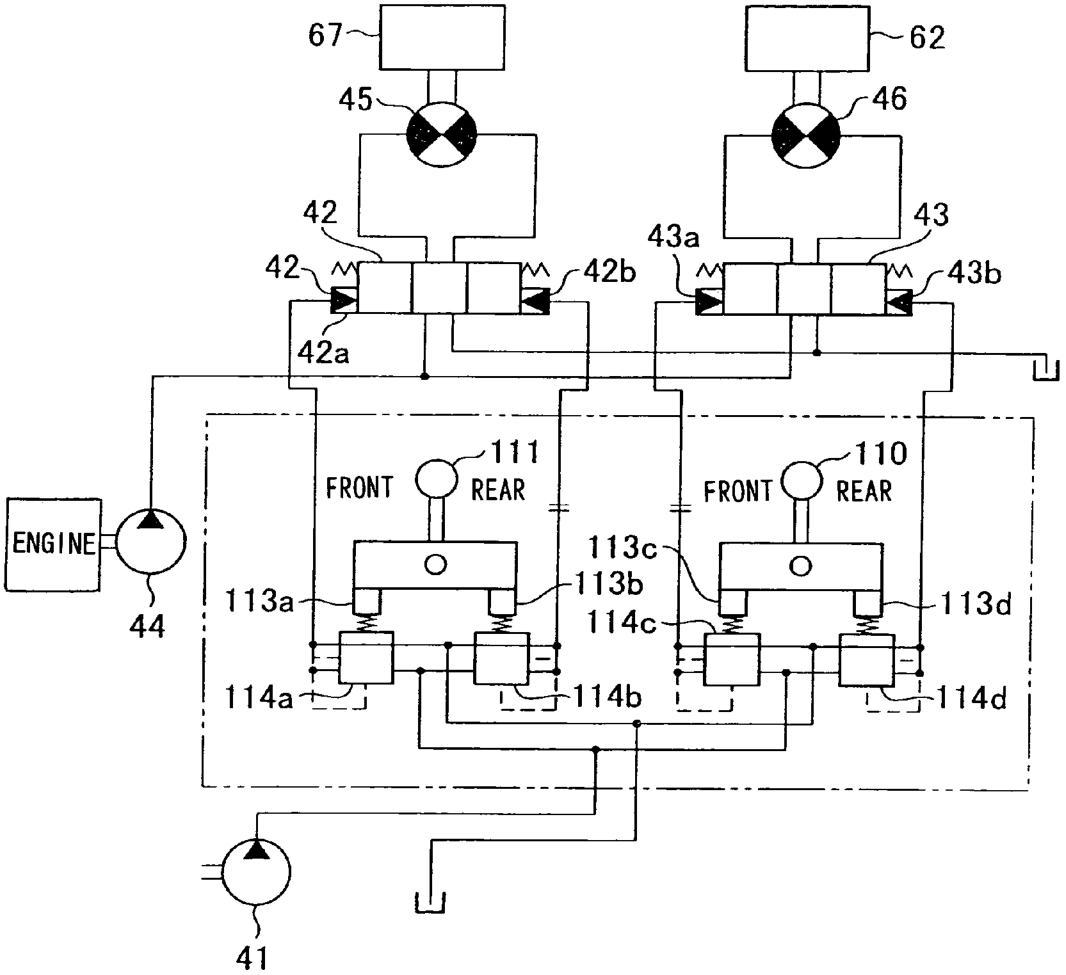
FIG. 17 is a hydraulic circuit diagram of the actuators driven by operating the operating lever achieved in a second embodiment of the present invention.

FIG. 17 is a hydraulic circuit diagram of a hydraulic circuit that drives the swinging device 62 and the auxiliary hoist drum 67 mounted at the revolving superstructure 63 of the crawler crane. The same reference numerals are assigned to components in FIG. 17 that have functions identical to those of the components shown in FIG. 4. The following explanation focuses on the difference from the first embodiment. As shown in FIG. 17, separate levers, i.e., a swing lever 110 through which a command is issued to drive the swinging device 62 and an auxiliary hoist lever 111 through which a command is issued to drive the auxiliary hoist drum 67, are provided in the second embodiment instead of a joystick lever.

As the swing lever 110 is operated, a pilot valve 114*c* or 114*d* is driven via a spool 113*c* or 113*d* in correspondence to the operating direction and the operating quantity. As the auxiliary hoist lever 111 is operated, a pilot valve 114*a* or 114*b* is driven via a spool 113*a* or 113*b* in correspondence to the operating direction and the operating quantity. In response to the drive of the pilot valves 114*a* to 114*d*, the direction control valves 42 and 43 are switched to supply the pressure oil to the hydraulic motors 45 and 46 and thus, the auxiliary hoist drum 67 and the swinging device 62 are driven.

Figure 18:
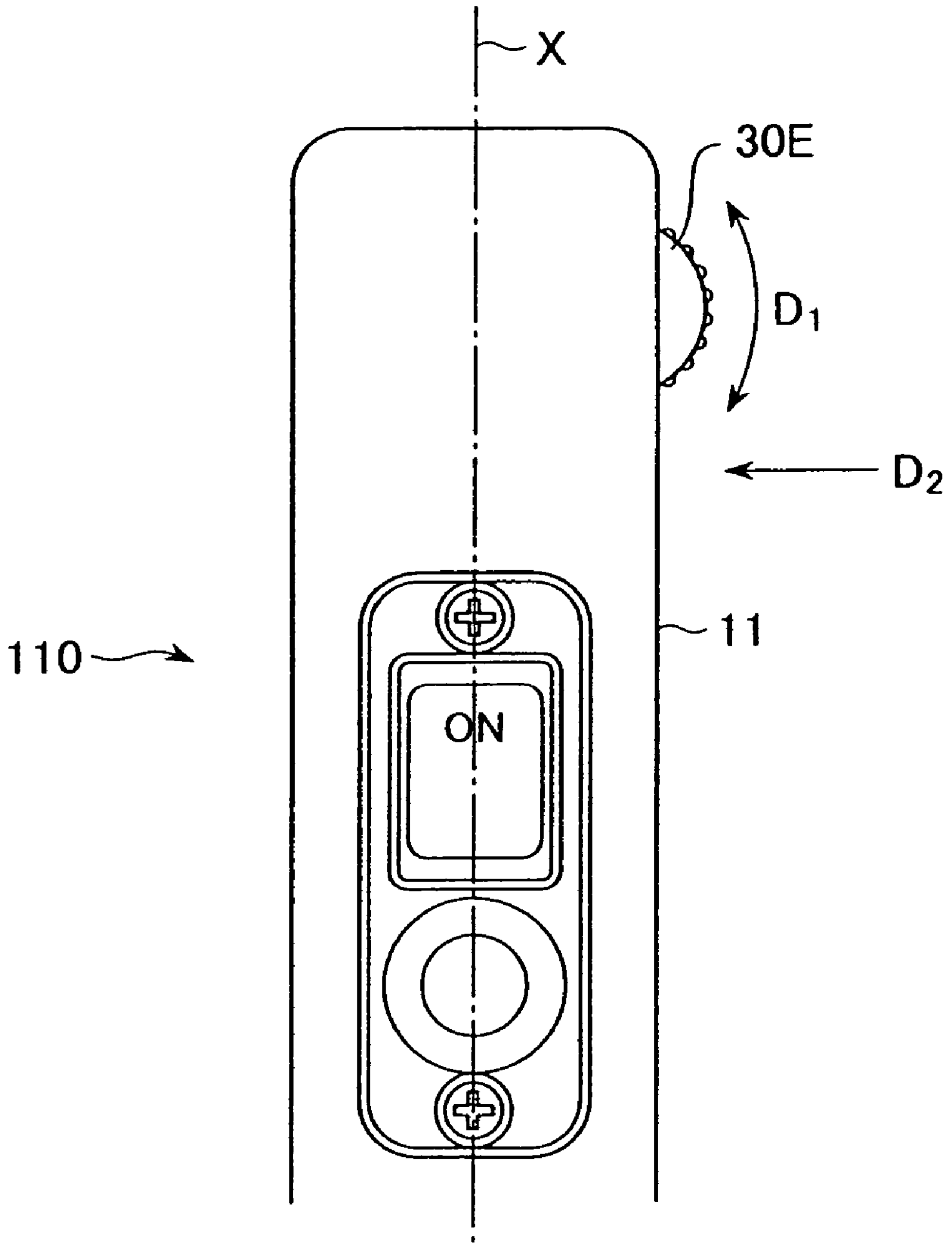
FIG. 18 is a side elevation of an upper portion of the operating lever.
Figure 19:
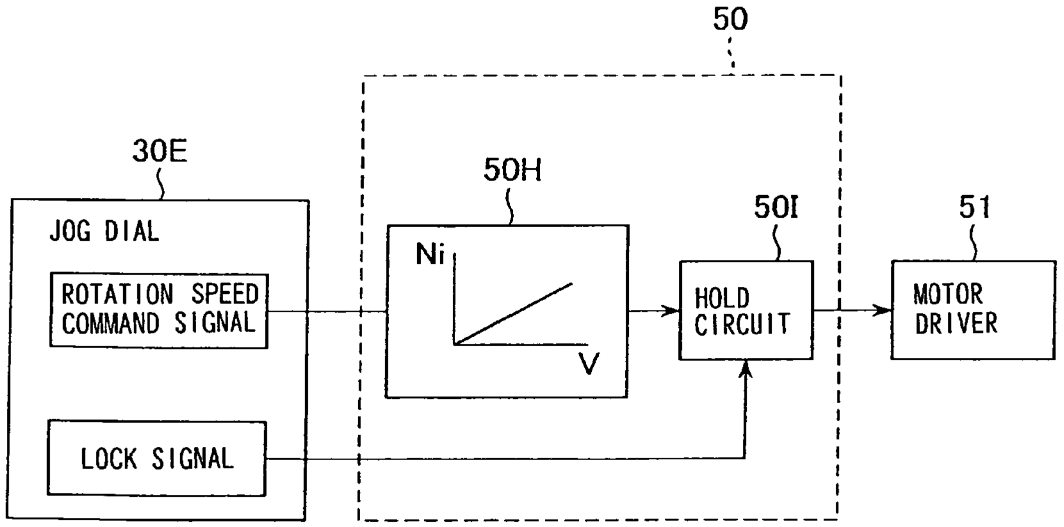
FIG. 19 is a conceptual diagram of the engine speed lock control.

FIG. 18 is a side elevation of an upper portion of a grip 11 which is fixed onto the swing lever 110. A rotary operating member 30E which is used to adjust the engine speed is provided near the top of the grip 11. The rotary operating member 30E is a so-called jog dial that can be rotated along each of the directions indicated by the arrows D1, i.e., along the axis X, and can also be pressed along the direction indicated by the arrow D2, i.e., along the direction perpendicular to the axis X. The engine speed setting selected by turning the jog dial 30E along one of the directions indicated by the arrows D1 can then be locked by pressing the jog dial 30E along the direction indicated by the arrow D2. FIG. 19 presents a conceptual diagram of the engine speed lock control.

As shown in FIG. 19, a rotation speed command signal which is generated in correspondence to the rotating operation of the jog dial 30E is input to a function generator 50H. A relationship whereby the rotation speed command value Ni increases as the level of the rotation speed command signal (voltage) V becomes higher, as shown in the figure, is set in advance at the function generator 50H. The function generator 50H outputs the rotation speed command value Ni corresponding to the voltage V to a hold circuit 50I. The jog dial 30E outputs a lock on signal to the hold circuit 50I when it is pressed along the direction indicated by the arrow D2 and outputs a lock off signal to the hold circuit 501 when it is pressed again along the direction indicated by the arrow D2.

As the lock on signal is input to the hold circuit 501, the hold circuit 501 holds the current rotation speed command value Ni and outputs that rotation speed command value Ni to the motor driver 51. When the lock off signal is input to the hold circuit 501, the hold circuit 501 immediately outputs the current rotation speed command value Ni input from the function generator 50H to the motor driver 51.

As described above, the jog dial 30E is used to select an engine speed setting and then lock the setting so as to not allow the rotation speed to change in the second embodiment. Since the engine speed is locked, the engine speed cannot be altered inadvertently even if the operator operates the jog dial 30E by mistake while operating the swing lever 110. As a result, the operability improves.

While an explanation is given above on an example in which the rotary operating member 30E is provided at the swing lever 110, the rotary operating member 30E may be instead provided at a lever used to issue a command to drive another actuator, e.g. , the auxiliary hoist lever 111. However, the engine speed does not need to be adjusted frequently during a swinging operation and, for this reason, greater convenience is afforded by providing the rotary operating member 30E at the swing lever 110 located on the left side of operator's seat so as to allow the operator to operate the main hoist drum 66 and the boom hoist drum 65 with his right hand while controlling the engine speed with his left hand.

It is to be noted that the jog dial 30E may be provided at a joystick lever used to issue commands to drive a plurality of actuators as well. For instance, the jog dial 30E may be provided in place of the rotary operating member 30 at the left lever 10L explained in reference to the first embodiment. Since the joystick lever is operated along a plurality of directions, a rotary operating member provided at the top of the grip 11 is more likely to be operated inadvertently, compared to a standard lever such as the swing lever 110. However, the engine speed setting can be locked by pressing the jog dial 30E and thus, any undesirable change in the engine speed is prevented to further improve the operability in the embodiment.

Figure 20:
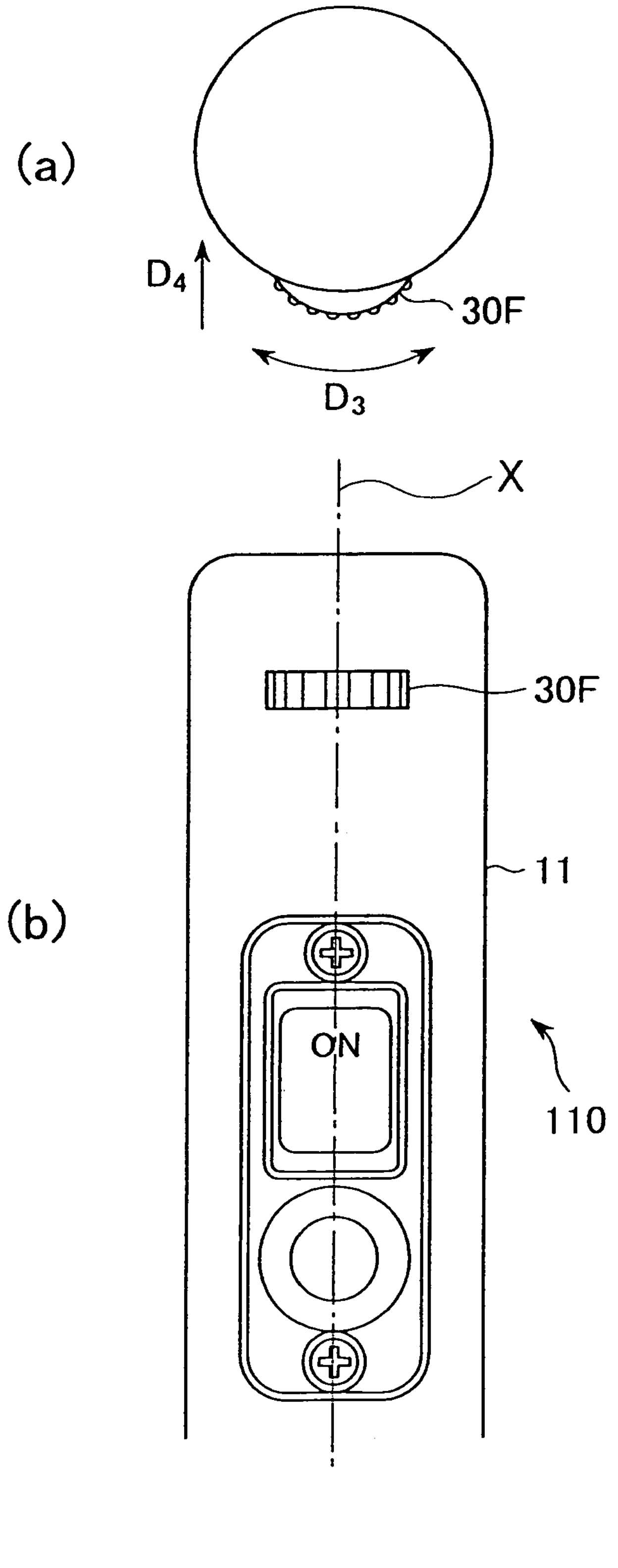
FIG. 20(*a*) is a top view of an operating lever and FIG. 20(*b*) is a side elevation of an upper portion of the operating lever.

It is also to be noted that instead of the jog dial 30E, a jog dial 30F shown in FIGS. 20(*a*) and 20(*b*) may be provided near the top of the grip 11. FIG. 20(*a*) is a top view of the grip 11, and FIG. 20(*b*) is a side elevation of an upper portion of the grip 11. The jog dial 30F is rotated along either of the directions indicated by the arrows D3 to select an engine speed setting and then is pressed along the direction indicated by the arrow D4 to lock the rotation speed setting.

Figure 21:
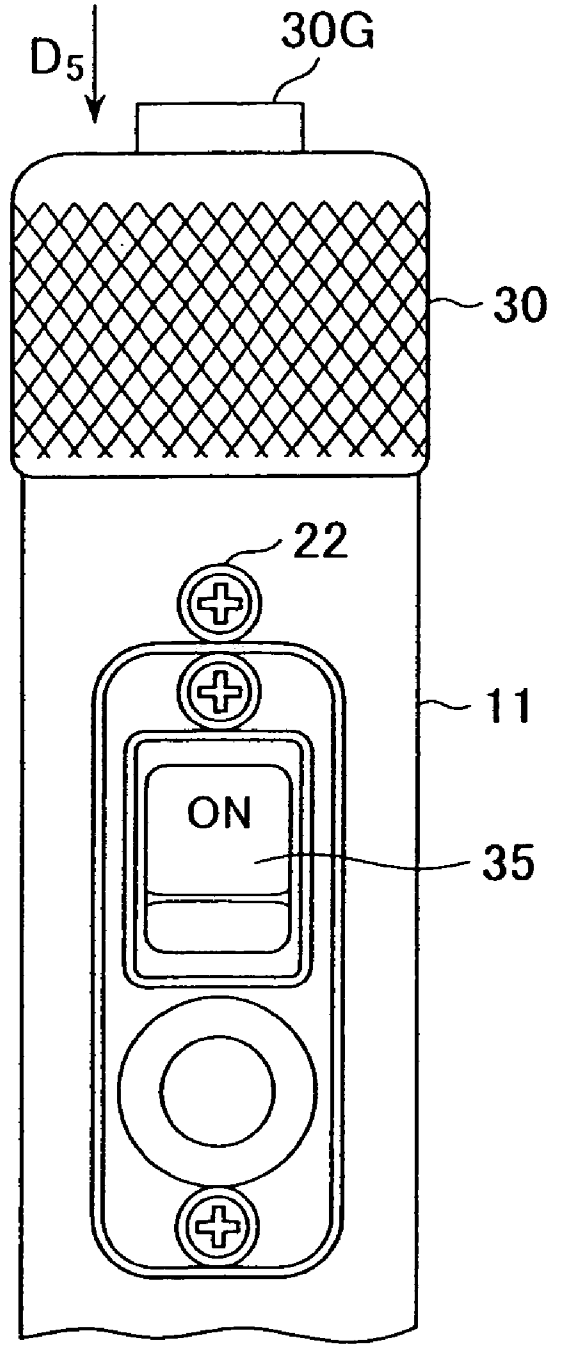
FIG. 21 is a side elevation of an upper portion of an operating lever.

Alternatively, as shown in FIG. 21, an engine speed locking switch 30G may be provided at the upper end of the rotary operating member 30 explained in reference to the first embodiment. FIG. 21 is a side elevation of an upper portion of the grip 11. In this case, an engine speed setting is selected in conformance to an operation of the rotary operating member 30 and then the rotation speed is locked at the currently selected setting, as the switch 30G is pressed along the direction indicated by the arrow D5. An alternative structure that does not include the switch 30G but allows the engine speed setting to be locked as the rotary operating member 30 itself is pressed along the direction indicated by the arrow D5 may be adopted as well.

Advantages similar to those explained earlier can be achieved in conjunction with a jog dial 30F shown in FIGS. 20(*a*) and 20(*b*) or the switch 30G shown in FIG. 21.

While an explanation is given above in reference to the embodiments on an example in which the operating levers 10L and 10R and the swing lever 110 are provided to operate a crawler crane, these levers may be adopted in another type of construction machine such as a hydraulic excavator.

Actuators to which drive commands are issued via the operating levers 10L and 10R are not limited to hydraulic actuators, and they maybe, for instance, electrically driven actuators, instead. The operation quantity of the rotary operating member 30 may be detected with an operating quantity detector other than the potentiometer 23.

In addition, while an engine is used as a prime mover for the construction machine, an electric motor may be used instead of the engine.

INDUSTRIAL APPLICABILITY

While an explanation has been given above on an example in which the operating lever is adopted in a crawler crane, the present invention may be adopted with equal effectiveness in a construction machine other than a crawler crane.

The invention claimed is:

1. An operating lever device for a construction machine, comprising:

- a joystick lever used to issue drive commands to a plurality of driving bodies;
- a grip main body that is mounted at a front end of the joystick lever in such a manner that the grip main body does not rotate relative to the joystick lever;
- an operating member that is allowed to rotate relative to the grip main body and is rotated to adjust a prime mover rotation speed, with the operating lever device that has the operating member provided on each of a left side and a right side in an operator's cab of the construction machine; and
- an altering device that alters characteristics of a prime mover rotation speed command value corresponding to a prime mover rotation speed command signal in conformance to a rotating operation of the operating member, wherein:
- the altering device alters the characteristics of the prime mover rotation speed command value so as to increase the prime mover rotation speed when the operating member located on the left side in the operator's cab is rotated along one direction and also increases the prime mover rotation speed when the operating member located on the right side in the operator's cab is rotated along another direction.

2. An operating lever device for a construction machine according to claim 1, wherein:

- the plurality of driving bodies include a swinging device which supports a revolving superstructure of the construction machine so as to allow the revolving superstructure to swing relative to a traveling structure of the construction machine; and one of the operating lever devices located on the left side and the right side in the operator's cab is an operating lever device that controls drive of the swinging device.

3. An operating lever device for a construction machine according to claim 1, wherein:

the operating member is provided at a top of the grip main body.

4. An operating lever device for a construction machine according to claim 3, wherein:

a collar portion is provided at a bottom of the grip main body.

5. An operating lever device for a construction machine according to claim 1, wherein:

the operating member is allowed to rotate around a central axis extending along a longitudinal direction of the grip main body.

6. An operating lever device for a construction machine according to claim 1, wherein:

the grip main body is a substantially cylindrical shape, and the operating member is formed as a lid that is a substantially cylindrical shape.

7. An operating lever device for a construction machine according to claim 1, wherein:

a rotation of the operating member is limited to a predetermined operating extent, and the predetermined operating extent corresponds to a predetermined maximum prime mover rotation speed.

8. An operating lever device for a construction machine according to claim 1, further comprising:

an operating extent detector that detects an operating extent of the operating member and outputs the detected operating extent to a control device which adjusts the prime mover rotation speed.

9. An operating lever device for a construction machine according to claim 2, wherein:

the operating lever device that controls drive of the swinging device comprises a swing brake switch through which a command for engaging a swing braking device that disallows a swinging motion of the revolving superstructure is issued.

10. An operating lever device for a construction machine having a superstructure and a traveling structure, comprising:

a joystick lever used to issue drive commands to a plurality of driving bodies;

a grip main body that is mounted at a front end of the joystick lever in such a manner that the grip main body does not rotate relative to the joystick lever;

an operating member that is allowed to rotate relative to the grip main body and is rotated to adjust a prime mover rotation speed, with the operating lever device that has the operating member provided on each of a left side and a right side in an operator's cab of the construction machine; and a selector switch that switches a prime mover rotation speed command signal from the operating member between a valid state and an invalid state, wherein:

the prime mover rotation speed command signal from the operating member provided at one of the operating lever devices disposed on the left side and the right side in the operator's cab is set to a valid state in response to a command issued through the selector switch, and wherein the superstructure of the construction machine rotates with respect to the traveling structure of the construction machine based on the prime mover rotation speed.

11. A prime mover rotation speed control system, wherein:

a prime mover rotation speed command value from an operating lever device for a construction machine, a prime mover rotation speed command value originating from an accelerator pedal and a prime mover rotation speed command value originating from a fuel lever are compared, with the operating lever device for a construction machine, comprising a joystick lever used to issue drive commands to a plurality of driving bodies, a grip main body that is mounted at a front end of the joystick lever in such a manner that the grip main body does not rotate relative to the joystick lever, and an operating member that is allowed to rotate relative to the grip main body and is rotated to adjust a prime mover rotation speed;

a largest value among the command values is selected; and prime mover rotation speed is controlled in conformance to the largest value thus selected.

12. An operating lever device for a construction machine having a superstructure and a traveling structure, comprising:

a lever used to issue a drive command for a driving body;

a grip main body provided at a front end of the lever in such a manner that the grip main body does not rotate relative to the lever;

an operating member that is provided at a top of the grip main body and is operated to adjust a prime mover rotation speed; and a locking member that locks the prime mover rotation speed at the prime mover rotation speed having been set with the operating member, and wherein the superstructure of the construction machine rotates with respect to the traveling structure of the construction machine based on the prime mover rotation speed.

13. An operating lever device for a construction machine according to claim 12, wherein:

the operating member and the locking member are formed as an integrated dial and the prime mover rotation speed is set by rotating the dial and the prime mover rotation speed thus set is locked by pressing the dial.

14. An operating lever device according to claim 12, wherein:

the lever is a joystick lever through which drive commands are issued to a plurality of driving bodies.

* * * * *